(12) United States Patent
Beniyama et al.

(10) Patent No.: US 8,150,658 B2
(45) Date of Patent: Apr. 3, 2012

(54) THREE-DIMENSIONAL OBJECT RECOGNITION SYSTEM AND INVENTORY SYSTEM USING THE SAME

(75) Inventors: Fumiko Beniyama, Yokohama (JP); Toshio Moriya, Tokyo (JP); Yoshihiro Masuyama, Koganei (JP); Nobutaka Kimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 12/502,719

(22) Filed: Jul. 14, 2009

(65) Prior Publication Data

US 2010/0017407 A1 Jan. 21, 2010

(30) Foreign Application Priority Data

Jul. 16, 2008 (JP) .................. 2008-184686

(51) Int. Cl.
*G06F 15/00* (2006.01)
*G06F 17/00* (2006.01)

(52) U.S. Cl. ....................... 702/189; 707/600

(58) Field of Classification Search .................. 702/152, 702/189; 382/225, 227; 707/600, 634, E17.055; 700/178, 193
See application file for complete search history.

(56) References Cited

U.S. PATENT DOCUMENTS

| 6,539,115 B2 * | 3/2003 | Fujimoto et al. .............. 382/225 |
| 2008/0273757 A1 * | 11/2008 | Nakamura et al. ............ 382/104 |

FOREIGN PATENT DOCUMENTS

| JP | 10-017121 | 1/1998 |
| JP | 2001-088912 | 4/2001 |

\* cited by examiner

*Primary Examiner* — Bryan Bui
(74) *Attorney, Agent, or Firm* — Foley & Lardner LLP

(57) ABSTRACT

A system recognizes an arrangement of an object and counts the number of objects, comprising: a sensor for measuring a distance between the sensor and an object; a moving mechanism for moving the sensor; and a computer that is connected with the sensor and includes an object information database, an object arrangement database; a sensor data integrating section; and the sensor an object comparison calculator adapted to create an object model based on the data.

18 Claims, 17 Drawing Sheets

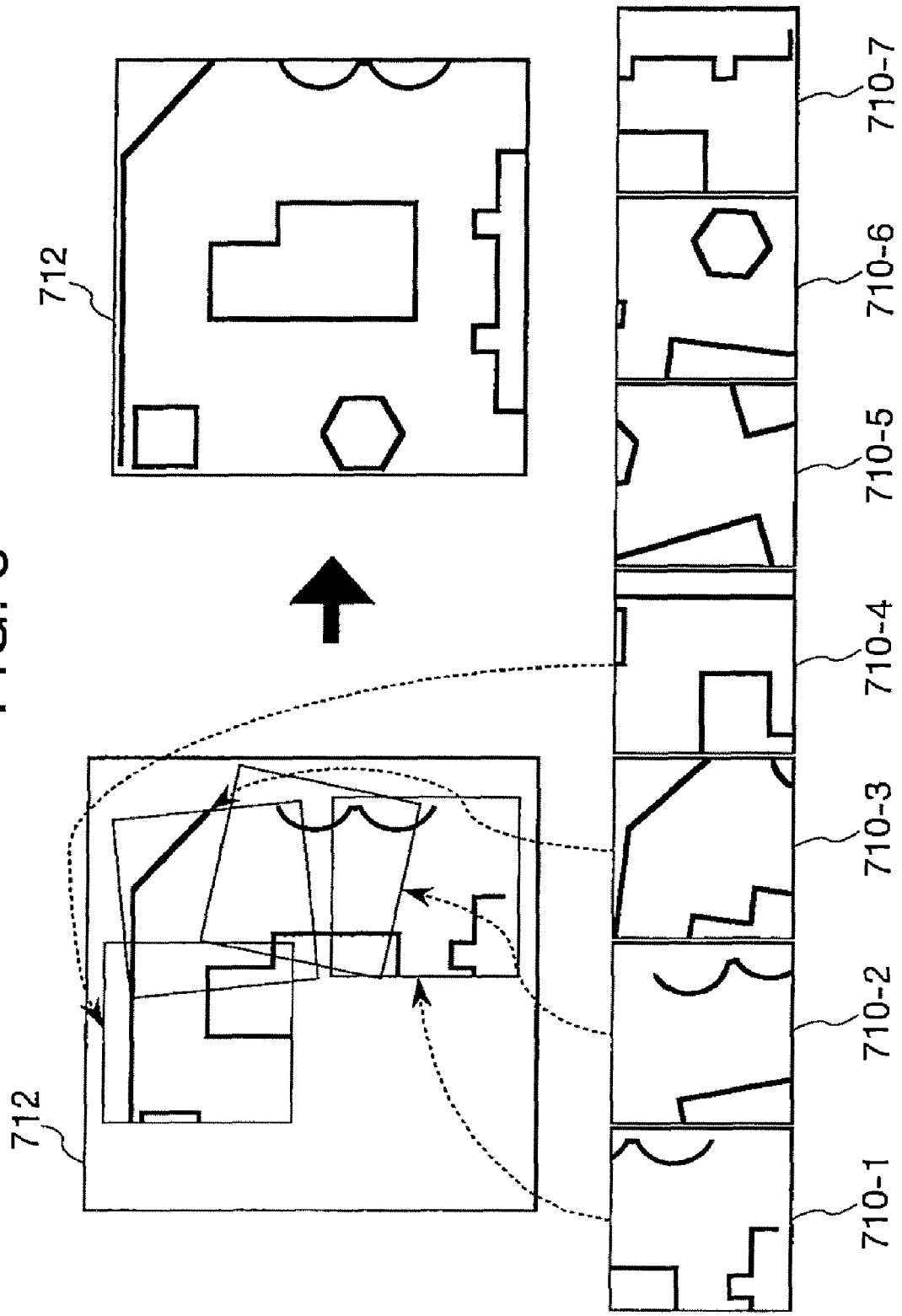

OBJECT INFORMATION DATABASE 144

| TYPE | SHAPE | WIDTH | DEPTH | HEIGHT | ... |
|------|-------|-------|-------|--------|-----|
| 1 | RECTANGULAR PARALLELEPIPED | X1 | Y1 | Z1 | ... |
| 2 | RECTANGULAR PARALLELEPIPED | X2 | Y2 | Z2 | ... |
| 3 | RECTANGULAR PARALLELEPIPED | X3 | Y3 | Z3 | ... |
| ... | ... | ... | ... | ... | ... |

OBJECT ARRANGEMENT DATABASE 145

INTEGRATED DATA

SETTING OF OBJECT PLACEABLE REGION

COMPARISON OF OBJECTS

DISPLAY OF GLOBAL, ACTUAL ARRANGEMENT
DATA AND NUMBER OF OBJECTS 24　　79　　39

THREE-DIMENSIONAL OBJECT RECOGNITION SYSTEM AND INVENTORY SYSTEM USING THE SAME

This application claims priority from Japanese Patent Application 2008-184686 filed on Jul. 16, 2008. The entire content of the aforementioned application is incorporated herein by reference.

BACKGROUND OF THE INVENTION

The present invention relates to a three-dimensional object recognition system for automatically recognizing the state of an object, and an inventory system using the three-dimensional object recognition system.

With an increase in the amount of information regarding various fields, how to collect information or how to manage and use information has become extremely important. At shipping sites, information is typically handled as follows. Barcodes are attached to products so that product information may be read from the barcodes by a barcode reader, as one of methods for managing information. Alternatively, radio frequency identification (RFID) tags are attached to products so that product information may be read wirelessly from the RFID tags. Pieces of information for product shipping and inventory are shared between companies by using these methods. Such a sharing of information may provide shipping, factory and sales sites with various advantages such as labor-saving of product inspection and inventory works.

Under such circumstances, an inventory system has been proposed, which automatically counts the number of products by setting a pressure sensor to a shelf and detecting a load (JP-A-10-17121). In addition, another inventory system has been proposed, which counts the number of products by extracting outlines of the products from images acquired by a camera and comparing the outlines with characteristic data profiles (JP-A-2001-88912).

SUMMARY OF THE INVENTION

For inventory work, it is necessary to check the number of products and manage the positions of the products. For the current inventories, manpower is necessary and inventory systems are not automated. Barcodes are mainly used to manage the types of products. It is general that the number of products is visually managed. There is a method for simultaneously managing the types of products and the numbers of the products by wirelessly reading electronic tags such as RFID tags. However, some products may be overlooked. In addition, such an inventory system is expensive for adoption and is not in practical use.

Since the system described in JP-A-10-17121 counts the number of products by detecting a load, it is necessary that the sensor for measuring a weight be attached to a shelf. That is, it is necessary to build an infrastructure to manage the number of products. Attaching sensors to all shelves are not realistic especially in a large distribution warehouse. For the system described in JP-A-2001-88912, it is necessary that a device for controlling the camera be attached to a ceiling or wall surface of a store. That is, it is necessary to build an infrastructure to manage the number of products. In addition, since an operation of the camera is predetermined, data that can be acquired is restricted. Furthermore, since only the camera recognizes products, a calculation such as an extraction of characteristic points of each of the products is complicated.

JP-A-10-17121 and JP-A-2001-88912 do not describe management of the positions of objects (products) in a distribution warehouse.

It is, therefore, an object of the present invention to provide a three-dimensional object recognition system for automatically recognizing the state of an object and an inventory system that uses the three-dimensional object recognition system to recognize the positions of objects (products) in a distribution warehouse and count the number of the objects (products).

A preferred aspect of the present invention describes the following three-dimensional object recognition system or inventory system.

A three-dimensional object recognition system comprising: a sensor for measuring a distance between the sensor and an object; a moving mechanism for moving the sensor; and a computer connected with the sensor. The computer includes: an object information database storing at least data indicative of the shape of the object; an object arrangement database storing data indicative of an arrangement pattern of the object; a sensor data integrating section adapted to receive sensor data and sensor position data, the sensor data being obtained by measuring the distance between the sensor and the object when the moving mechanism is moving the sensor, the sensor position data being indicative of the position of the sensor when the sensor obtains the sensor data, integrate the sensor data in a three-dimensional space based on the sensor position data, and output the integrated data indicative of the outline of the object; and an object comparison calculator adapted to create an object model based on the data indicative of the shape of the object and stored in the object information database, reference the data indicative of the arrangement pattern of the object and stored in the object arrangement database, compare the created object model with the integrated data, and output actual object arrangement data indicative of an actual arrangement of the measured object.

In another preferred aspect of the present invention, the computer further includes an object position calculator that generates global actual object arrangement data indicative of the actual position of the object in a three-dimensional global space based on the sensor position data and the actual object arrangement data.

In still another preferred aspect of the present invention, the object position calculator outputs the global actual object arrangement data including the number of objects.

In still another preferred aspect of the present invention, the object comparison calculator counts the number of the objects.

In still another preferred aspect of the present invention, the three-dimensional object recognition system or inventory system further includes another sensor for identifying the position of the sensor that is moved by the moving mechanism.

According to the present invention, the sensor moves and measures an object to generate data, and the object comparison calculator calculates the three-dimensional shape of the object based on the data generated by the sensor. The object comparison calculator compares data of the calculated three-dimensional shape with data indicative of object attributes stored in the object information database to recognize whether or not the object is present and count the number of objects.

The inventory system, which recognizes an arrangement of objects placed in a distribution warehouse and counts the number of the objects, can be realized by using the three-dimensional object recognition system.

These and other features, objects and advantages of the present invention will become more apparent from the following description when taken in conjunction with the accompanying drawings.

BRIEF DESCRIPTION OF THE DRAWINGS

FIG. 3 is a diagram showing creation of an environment map.

DESCRIPTION OF THE EMBODIMENTS

Figure 1:
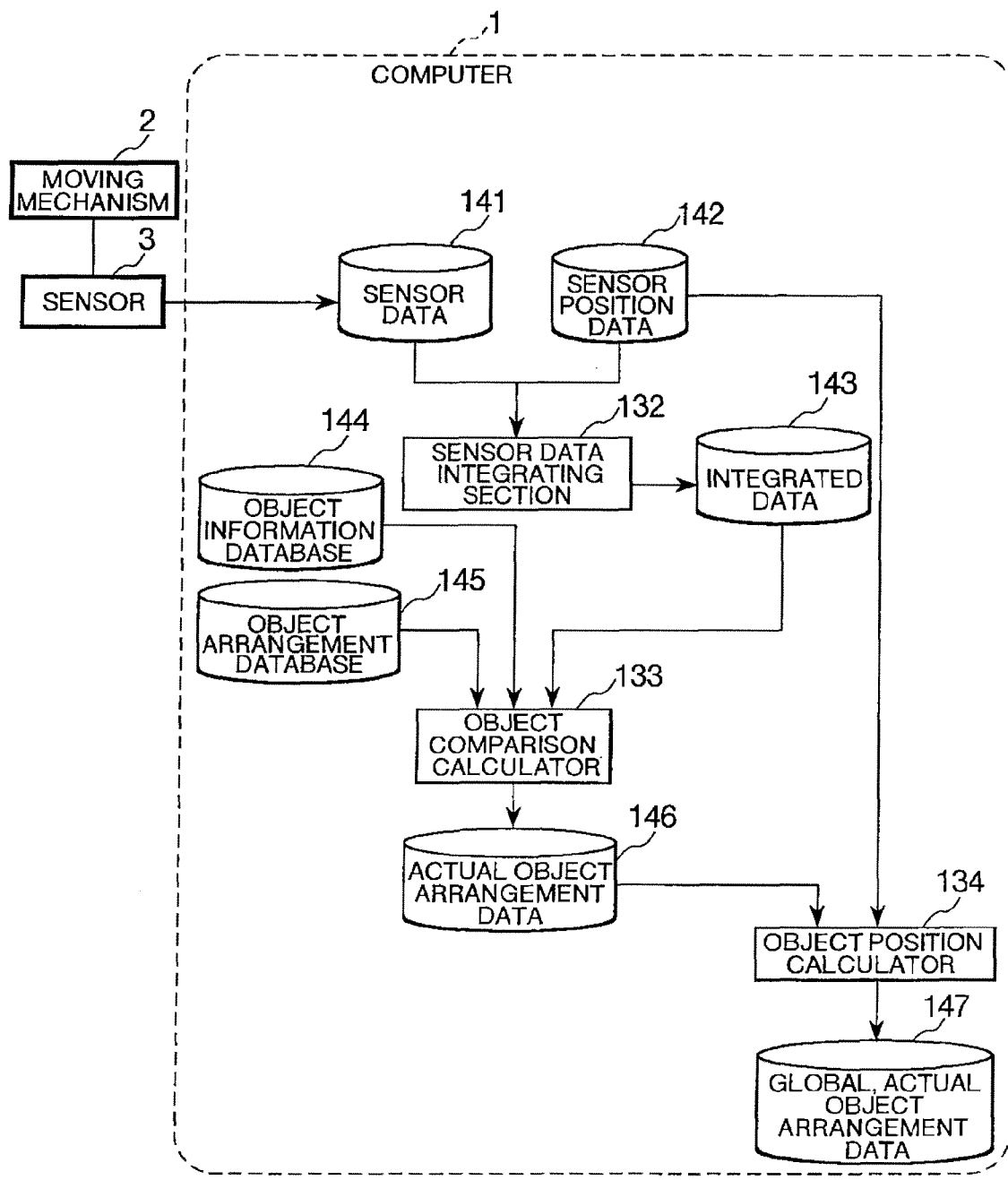
FIG. 1 is a functional block diagram of a three-dimensional object recognition system.

An embodiment of the present invention is described below with reference to the accompanying drawings. The present embodiment describes a three-dimensional object recognition system for recognizing a target object such as a product placed in a distribution warehouse. FIG. 1 is a functional block diagram of the three-dimensional object recognition system. The outline of the present embodiment is described below with reference to FIG. 1. The three-dimensional object recognition system includes a computer 1, a moving mechanism 2, and a sensor 3. The moving mechanism 2 moves the sensor 3. The sensor 3 sequentially generates sensor data 141, while the sensor 3 moves. The sensor 3 serves as a range sensor that measures a distance between the sensor and a target object.

The computer 1 has an object information database 144, an object arrangement database, 145, a sensor data integration section 132, and an object comparison calculator 133. The sensor data integrating section 132 receives the sensor data 141 and sensor position data 142 indicative of the position of the sensor 3 from the sensor 3. The sensor data integrating section 132 plots the sensor data 141 in a three-dimensional space, based on the sensor position data 142, to integrate the sensor data 141. The sensor data integrating section 132 then outputs the integrated data 143.

The object comparison calculator 133 receives the integrated data 143 indicative of the three-dimensional shape of the object, a data indicative of the shape and attribute of an object(s) and registered beforehand in the object information database 144, the registered data being based on the type of the object, and a data indicative of an arrangement (stowage) pattern of an object(s) and registered beforehand in the object arrangement database 145. The object comparison calculator 133 compares the integrated data 143 (obtained by the actual measurement performed by the sensor 3) with the data registered in the databases 144 and 145 to recognize the actual arrangement of the object and output data (actual object arrangement data) 146 indicative of the actual arrangement of the object.

The object position calculator 134 receives the actual object arrangement data 146 and the sensor position data 142 which indicates the sensor position when the sensor 3 senses the object. The object position calculator 134 then calculates the position of the object in the three-dimensional space based on the actual object arrangement data 146, and outputs global actual object arrangement data 147 which indicates the position of the object in the three-dimensional space.

The object position calculator 134 may first determine the position of the object in the three-dimensional space (global coordinate system described later) based on the integrated data 143 and the sensor position data 142. After that, the object comparison calculator 133 may uses the global coordinate system to perform the aforementioned processing.

The sensor 3, the sensor position data 142 and the integrated data 143, which are shown in FIG. 1, are described below.

Figure 4A:
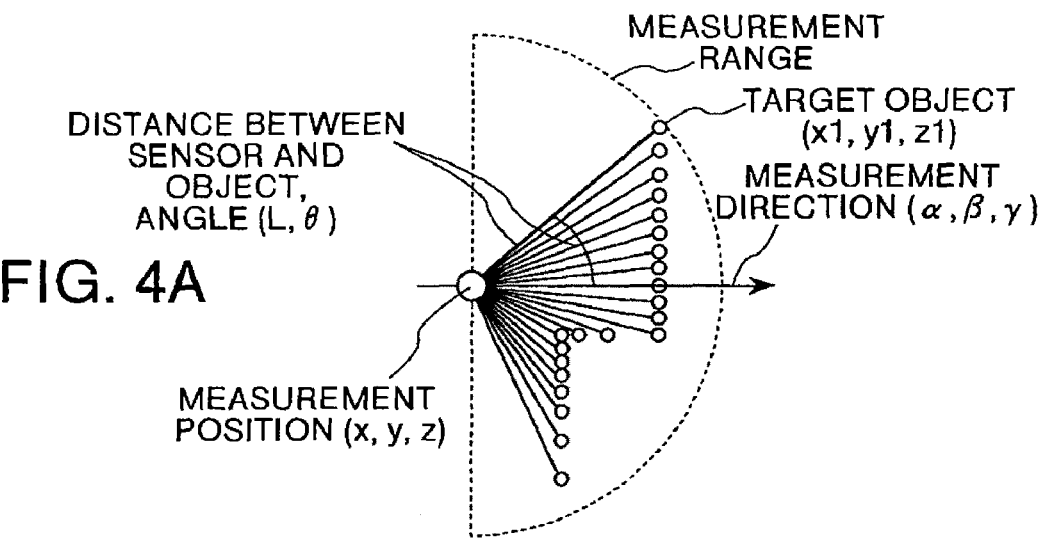
FIGS. 4A to 4C are diagrams showing integrated data.

The sensor 3 is described with reference to FIG. 4A. In FIG. 4A, the sensor 3 is located at a position (x, y, z). A measurement direction to which the sensor 3 faces is indicated as a direction ($\alpha$, $\beta$, $\gamma$). The sensor 3 senses the target such as an object or an obstacle in a certain plane at each predetermined angle (for example, one degree). That is, the sensor 3 detects a distance L between the sensor 3 and the target and an angle $\theta$ formed between the measurement direction ($\alpha$, $\beta$, $\gamma$) and a direction to which the target is placed, that is, the sensor 3 conducts sensing. The sensor 3 outputs data indicative of the sensed distance and the sensed angle as data (L, $\theta$). In other words, the sensor 3 scans the target (such as an object or an obstacle) in the certain plane at each predetermined angle. In FIG. 4A, the sensor 3 senses a target in a range of $-90$ degrees to $+90$ degrees with respect to the measurement direction ($\alpha$, $\beta$, $\gamma$). As a typical example of the sensor 3 mounted on the moving mechanism 2 that moves in an x-y plane, the sensor 3 is mounted on the moving mechanism 2 at a predetermined vertical position (measured in a z axis) and faces to a predetermined measurement direction to scan the target in a direction parallel to the z axis (perpendicular to the x-y plane). In this case, the vertical position z of the sensor 3 (at which the sensor 3 scans a target), and an elevation vector $\gamma$ in the measurement direction, are constant. Data (described later) indicative of the position and direction of the sensor 3 is formed by combining the position (x, y, z) of the sensor 3 and the measurement direction ($\alpha$, $\beta$, $\gamma$).

Descriptions about the sensor position data 142 are made below. To recognize the position of the sensor 3 mounted on the moving mechanism 2, after map data indicative of a region of the movement of the moving mechanism 2 is referenced, based on a difference between the accumulated number of rotations of wheels of the moving mechanism 2 and the accumulated number of rotations of left and right wheels of the moving mechanism 2, a moving distance and rotation angle of the moving mechanism 2 from a standard position are calculated to estimate the current position and direction of the sensor 3.

The following method is described with reference to FIGS. 2 and 3. The method is to estimate the position and direction of the sensor 3 in the case where the map data indicative of the region of the movement of the moving mechanism 2 is not provided. Due to absence of the map data, the position and direction of the sensor 3 are estimated while a map is created. The map to be created is called an environment map.

Figure 2:
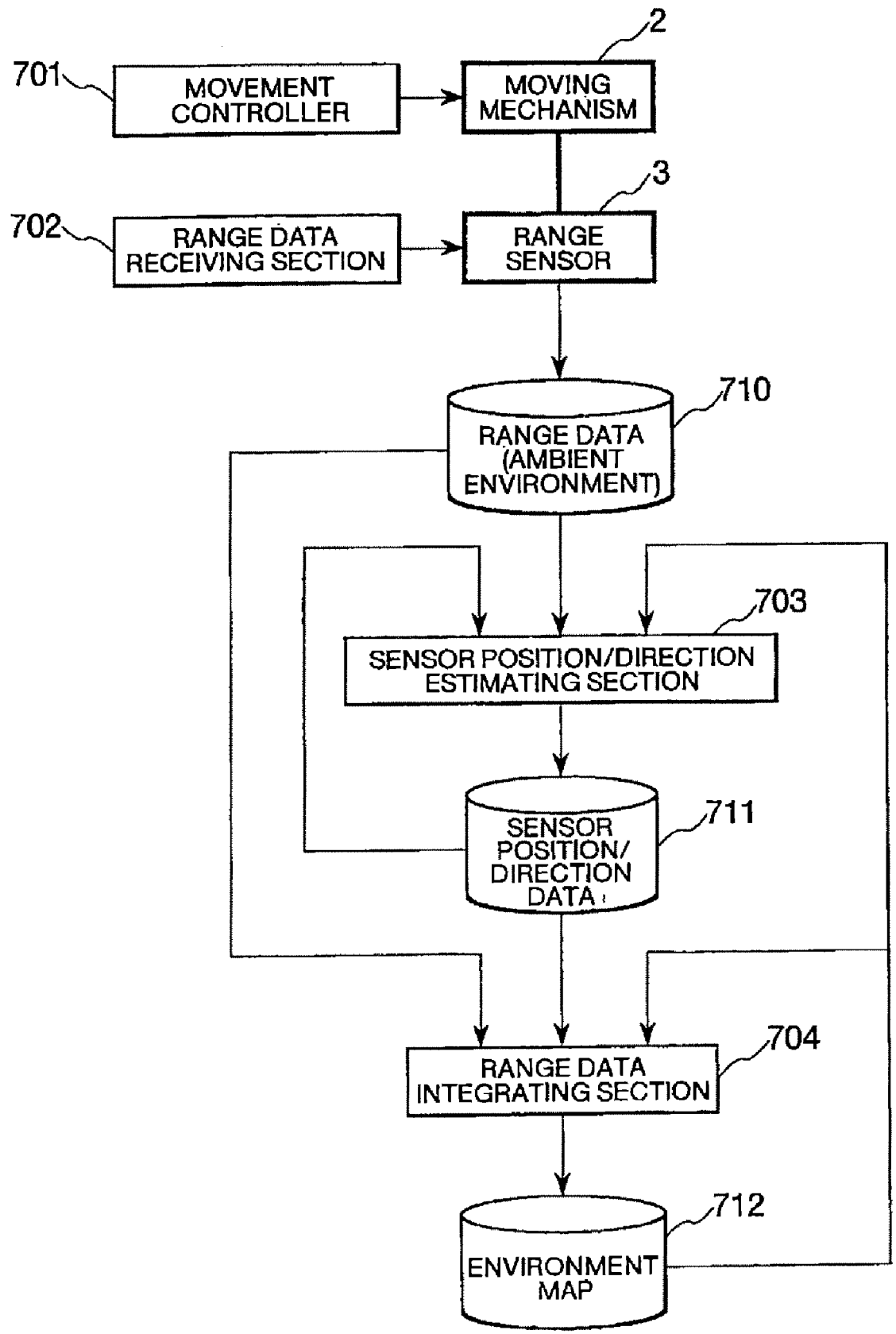
FIG. 2 is a functional block diagram of a computer connected with a moving mechanism and a sensor.

FIG. 2 is a functional block diagram of the computer 1 that is connected with the moving mechanism 2 and the sensor 3 that is mounted on the moving mechanism 2 and serves as a range sensor for environmental measurement. In order to estimate the position and direction of the moving mechanism 2, the sensor 3 is mounted on the moving mechanism 2 such that a scanning surface of the sensor is parallel to the x-y plane. A moving controller 701 controls the moving mechanism 2 to specify a destination to which the moving mechanism 2 moves. A range data receiving section 702 controls the sensor 3 to receive range data 710 from the sensor 3. The range data 710 is a group of the data (L, $\theta$) obtained by scanning a measurement range of the sensor 3 placed at a certain position.

A sensor position/direction estimating section 703 receives the range data 710, sensor position/direction data 711 (indicative of the position and direction of the sensor 3) and an environment map 712 (created before the data reception by the sensor position/direction estimating section 703). The sensor position/direction estimating section 703 then estimates the position and direction of the sensor 3 located when the sensor 3 receives new range data 710 to generate sensor position/direction data 711. The sensor position/direction data 711 is formed by combining a measurement position (x, y, z) and a measurement direction ($\alpha$, $\beta$, $\gamma$) in a coordinate space of the environment map 712. A range data integrating section 704 receives the sensor position/direction data 711, the range data 710 and the environment map 712 (created before the data reception by the range data integrating section 704) and updates data of the environment map 712.

A simultaneous localization and mapping (SLAM) technique is used for the processing of the sensor position/direction estimating section 703 and for the processing of the range data integrating section 704. The SLAM technique executes the two calculations simultaneously. Specifically, the SLAM is performed to match the range data 710 with the environment map 712 (created before the matching) to calculate the position of the sensor 3 in the environment map 712 and sequentially update the environment map 712 based on the calculated position of the sensor 3 in the environment map 712.

The creation of the environment map 712 (described with reference to FIG. 2) is described with reference to FIG. 3. The sensor 3 generates range data 710-1, 710-2, 710-3, . . . for each position of the moving sensor 3. The scanning surface of the sensor 3 is parallel to the x-y plane, and the sensor 3 moves in a direction parallel to the x-y plane. Therefore, the environment map 712 is created as a two-dimensional map in the x-y plane. An outline (indicated by a solid line shown in FIG. 3, or indicated by point cloud (described later)) of a target (such as an object or an obstacle) can be obtained from the range data 710, as shown in the range data 710-1. The range data 710-1 overlaps the range data 710-2 to match the outline of the target shown in the range data 710-1 with the outline of the target shown in the range data 710-2 and thereby create the environment map 712. Then, the environment map 712 formed by the range data 710-1 and 710-2 overlaps the range data 710-3 to match the outline of the target shown in the environment map 712 with the outline of the target shown in the range data 710-3 and thereby update the environment map 712. This processing is repeated to completely create the environment map 712. The sensor position/direction estimating section 703 references the position/direction data 711 indicative of the position and direction of the sensor 3 that obtains the previous range data 711. The sensor position/direction estimating section 703 then estimates the two-dimensional position of the sensor 3 in the environment map 712 by matching the sequentially updated environment map 712 with the range data 710. The position/direction estimating section 703 may use the vertical position of the sensor 3 to calculate the position of the sensor 3 in a three-dimensional space.

In the above description, the sensor 3 serves as the range sensor for environmental measurement. The sensor 3 may serve as a sensor for object measurement, which measures a distance between the sensor and an object and an angle formed between the measurement direction and a direction to which the object is placed. The scanning surface of the sensor 3 for environmental measurement is different from that for object measurement. As described later with reference to FIG. 19, it is preferable that both a range sensor 3a for environmental measurement and a range sensor 3b for object measurement be provided independently.

Figure 4B:
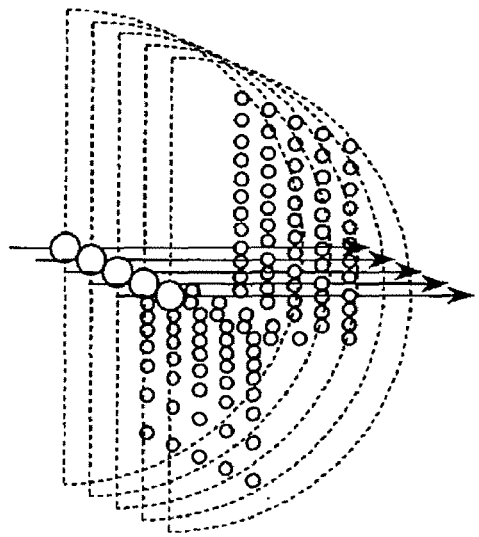
Figure 4C:
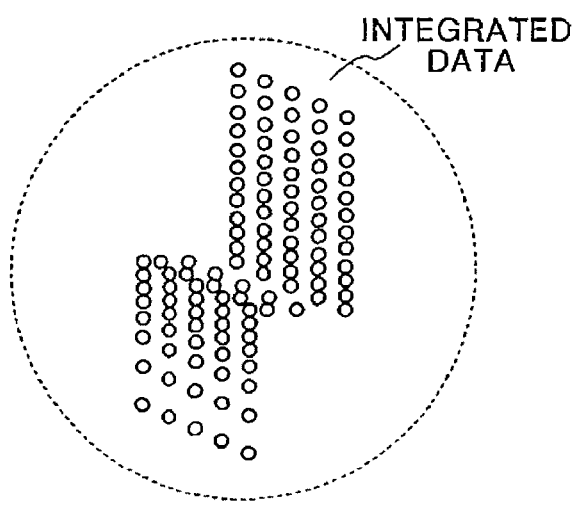

Next, descriptions about the integrated data 143 are made below with reference to FIG. 4A to 4C. As shown in FIG. 4A, three-dimensional coordinates (x1, y1, z1) of the target are calculated based on the range data (L, $\theta$) as an object measurement data and the position/direction data of the sensor 3, which is a combination of the measurement position (x, y, z) and the measurement direction ($\alpha$, $\beta$, $\gamma$). The measurement position (x, y, z) indicates the position of the sensor 3 located when the sensor 3 measures the target. The measurement direction ($\alpha$, $\beta$, $\gamma$) indicates the direction of the sensor 3. The range data (L, $\theta$) indicative of a distance L between the sensor and the target to be measured and an angle $\theta$ formed between the measurement direction and a direction to which the target is placed is obtained by the sensor 3 and used as object measurement data. The sensor 3 measures the target to obtain the range data while moving. That is, the sensor 3 obtains the range data at different positions. Thus, the range data is obtained as point cloud as shown in FIG. 4B. The range data composed of the point cloud is converted into data represented in a single coordinate system (for example, the same coordinate system as that of the environment map). The point cloud in the three-dimensional space is called the integrated data 143 as shown in FIG. 4C. The integrated data 143 is the point cloud represented by the distances between the sensor 3 and the target (such as an object or an obstacle) measured by the sensor 3 and the angles formed between the measurement direction and the directions to which the target is placed, as apparent from the above description. Thus, the integrated data 143 indicates the (three-dimensional) outline of the target represented when the target is viewed from the sensor 3.

Figure 5:
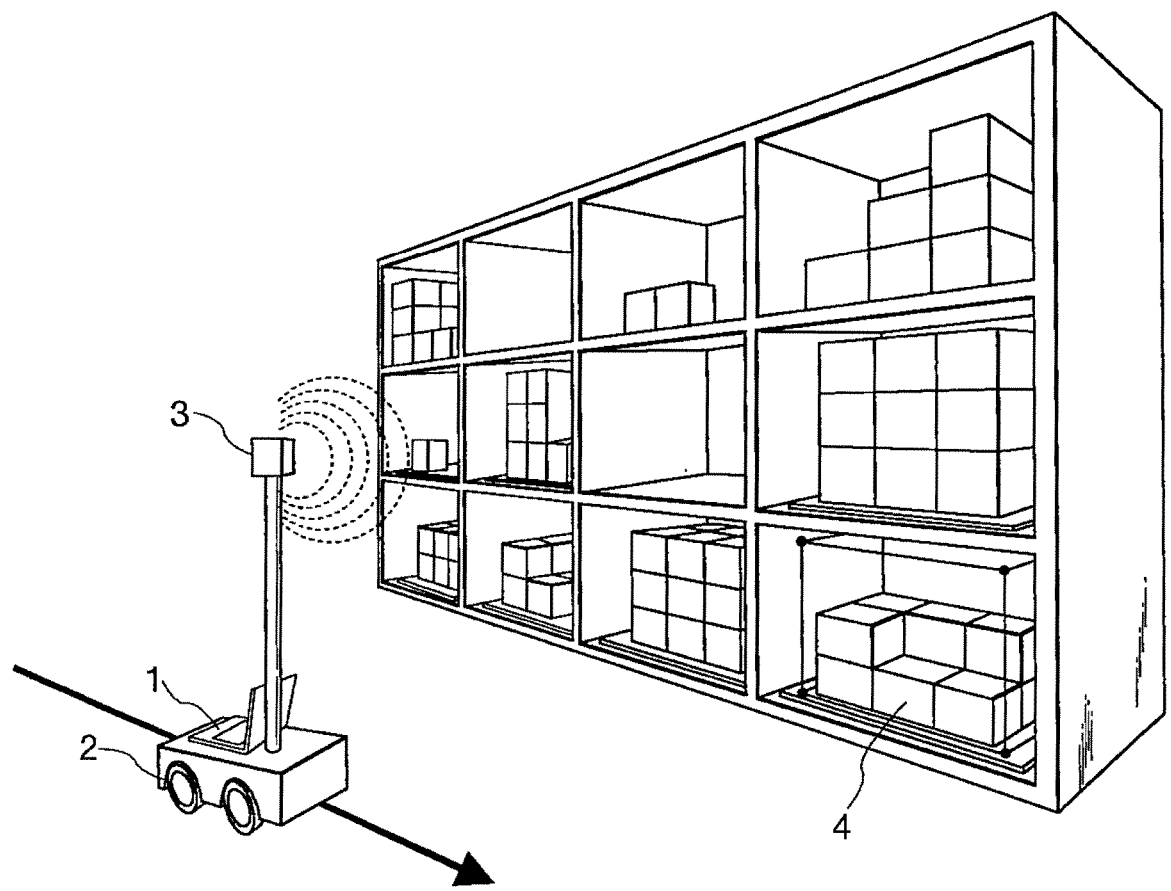
FIG. 5 is a diagram showing an example of the three-dimensional object recognition system used for inventory of products placed in a distribution warehouse.

FIG. 5 shows an example of the three-dimensional object recognition system used for inventory of products placed in a distribution warehouse. The three-dimensional object recognition system is used for inventory of products 4 placed in a space (rack placed in a distribution warehouse). The three-dimensional object recognition system includes the computer 1, the moving mechanism 2 and the sensor 3, which are adapted to recognize whether or not the products 4 are present. In FIG. 5, although the computer 1 and the sensor 3 are mounted on the moving mechanism 2, the computer 1 may not be mounted on the moving mechanism 2 and may be connected with the moving mechanism 2 and the sensor 3 via wireless communications.

The computer 1 can estimate the position and direction (that are measured by the sensor 3 as described above) of the sensor 3. Thus, the moving mechanism 2 may be a cart that manually moves as long as the moving mechanism 2 moves the sensor 3. It is, however, preferable that the moving mechanism 2 be a cart that can be controlled and moved by the computer 1 in order to reduce a time necessary for inventory. To measure products placed in a rack having a lot of shelves arranged in a direction (z direction) of the height of the rack, it is preferable that the moving mechanism 2 have a mechanism for changing the vertical position (measured in the z direction) of the sensor 3 and the measurement direction of the sensor 3 in order to detect the outlines of the products 4.

The sensor 3 is a laser range sensor for measuring a distance between the product and the sensor. The sensor 3 may have a camera, a RFID reader, a barcode reader or the like in order to determine the type of the product placed in the distribution warehouse. The camera is used to acquire an image of the product. The RFID reader is used to wirelessly read an IC tag. The barcode reader is used to read a barcode. In the present embodiment, the object information database 144 has data registered therein about the shape and attribute of a shipping box(es) formed based on the type of a product(s) as the shape and attribute of a target object. The products may be distinguished after the products are put in storage. In the present embodiment, however, when the products are put in storage, data indicative of a rack in which the products are placed based on the type of the products and other data are registered in the object information database 144.

Figure 6:
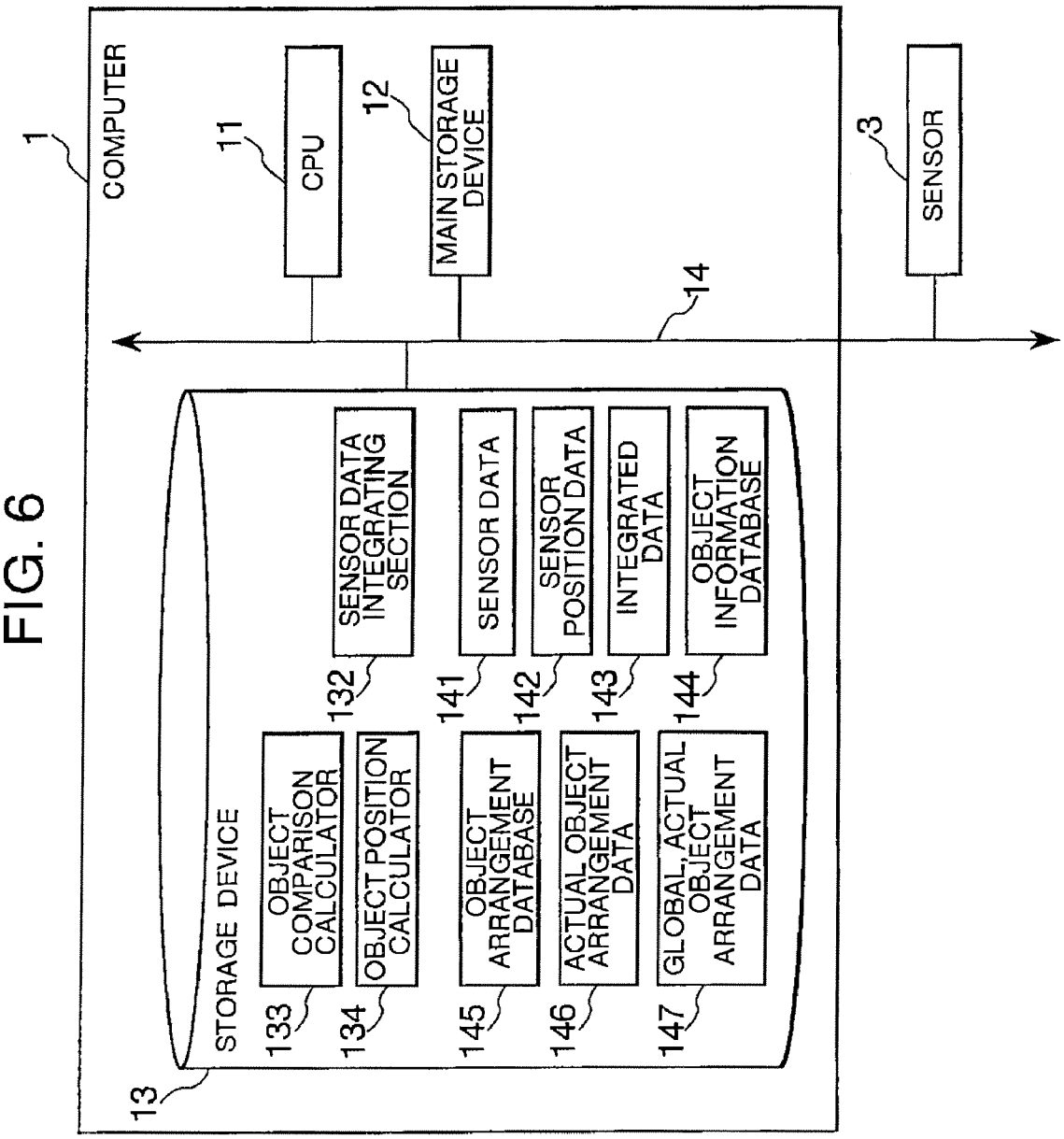
FIG. 6 is a diagram showing a hardware configuration of the three-dimensional object recognition system.

FIG. 6 shows an example of a hardware configuration of the three-dimensional object recognition system according to the present embodiment. The computer 1 includes a CPU 11, a main memory 12, a storage device 13 (such as a hard disk) and a bus 14 which connects the CPU 11, the main memory 12 and the storage device 13 to each other. The sensor 3 is connected with the computer 1 via the bus 14. The sensor 3 is controlled and operated by the CPU 11. In addition, a communication controller and an input/output device may be connected to the bus 14 when necessary.

The storage device 13 stores programs one of which is used by the sensor data integrating section 132, another one of which is used by the object comparison calculator 133, and still another one of which is used by the object position calculator 134. The programs are loaded to the main memory 12 and executed by the CPU 11.

The sensor data integrating section 132 receives the sensor data 141 and the sensor position data 142 and plots sensor information in a three-dimensional space to obtain the integrated data 143. The way to obtain the integrated data 143 is described again with reference to FIGS. 4A to 4C. A sequence (group) of points represented by the range data (distance L, angle θ) (shown in FIG. 4A) obtained by the sensor 3 at a time $t_i$ is plotted in the three-dimensional space represented in a range of a time $t_l$ to a time $t_n$ as shown in FIG. 4B. In the time range of the time $t_l$ to a time $t_n$, the sensor 3 is moved by the moving mechanism 2. The integrated data 143 is formed by plotting the sequence of points represented by the range data. The integrated data 143 is composed of the point cloud indicating the shape of the surface of the object as shown in FIG. 4C. The three-dimensional space in which the integrated data 143 is formed is represented by a local coordinate system (described later) or a global coordinate system (described later).

The object comparison calculator 133 compares the integrated data 143 which is actually measured values with data which indicates the shape and attribute of an object(s) and is stored in the object information database 144 and data which indicates arrangement of an object(s) and is stored in the object arrangement database 145. The object comparison calculator 133 then estimates the type and arrangement of an object based on the data stored in the object information database 144 and the data stored in the object arrangement database 145. After that, the object comparison calculator 133 compares the estimated type and arrangement with the integrated data 143 to outputs actual object arrangement data 146 which indicates the actual arrangement of the object. The actual object arrangement data 146 indicates how the object is arranged based on the type of the object. Thus, coordinate systems that are different from each other can be used for the respective types of objects. In a distribution warehouse, racks are placed on both sides of a path for warehousing and delivering products in many cases. Since the sensor 3 moves on the path, directions (measurement directions) from the sensor 3 toward each of the racks located on both sides of the path is different by 180 degrees. Therefore, the coordinate systems different from each other can be used for the respective types of objects, the actual object arrangement data 146 can be obtained based on the relative relationship between the position of the sensor and a product placed on the shelf of the rack. The coordinate system that varies depending on the type of the product is called a local coordinate system. The object comparison calculator 133 is described below in detail.

The object position calculator 134 outputs global actual object arrangement data 147 based on the actual object arrangement data 146 and the sensor position data 142 which indicates the sensor position when the sensor 3 measures an object. The global actual object arrangement data 147 indicates the position of the measured object in a three-dimensional space such as a large warehouse. When the actual object arrangement data 146 is represented in a local coordinate system, it is necessary to represent the position of an object in a distribution warehouse by means of an integrated coordinate system. The integrated coordinate system is called a global coordinate system. Each actual object arrangement data 146 represented in the local coordinate system is converted into data represented in a global coordinate system to obtain the global actual object arrangement data 147.

The sensor data 141 is the range data obtained by the sensor 3 as described above.

The sensor position data 142 indicates the sensor position when the sensor 3 obtains the sensor data 141 as described with reference to FIGS. 2 and 3, and is stored with the range data (distance L, angle θ) obtained at the time ti associated with. The sensor position data 142 indicates the position and direction of the sensor 3 in the three-dimensional space as described above.

The integrated data 143 is already described above with reference to FIGS. 4A to 4C.

Figures 7, 8:
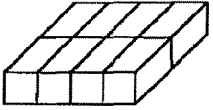
FIG. 7 is a diagram showing an example of data stored in an object information database.
FIG. 8 is a diagram showing an example of data stored in an object arrangement database.

The object information database 144 stores data of the attribute of an object. FIG. 7 shows an example of object information stored in the object information database 144.

The object information database 144 stores data of the attributes of objects such as the types 201, the shapes (rectangular parallelepiped, cylinder, triangular pyramid, and the like) 202, and the sizes (when the object is a rectangular parallelepiped, the width 203, the depth 204, the height 205 and the like). The object information database 144 is also used for other management of warehousing and delivery in addition to inventory of products placed in the distribution warehouse used in the present embodiment. Thus, the object information database 144 may store data indicative of the weights of the objects, ID numbers used for barcodes or RFIDs, images of the objects, logos and the like. The object information database 144 also stores information (a rack number and the like) specifying a rack predetermined based on the type 201 of the objects, although the information is not shown in FIG. 7. In addition, the object information database 144 may store various parameters (as described later) based on the types 201 of the objects.

The object arrangement database 145 stores data indicative of an arrangement of an object(s) based on the type and shape of the object. FIG. 8 shows an example of data stored in the object arrangement database 145. The object arrangement database 145 stores an arrangement (stowage) pattern of an object(s). A high arrangement (stowage) efficiency which does not cause collapse of objects is provided depending on the shapes and sizes of the objects in many cases. In an arrangement pattern 1 (301), the orientations of objects arranged on the same shelf are the same, and the orientations of objects vary depending on the shelf on which the objects are arranged. In an arrangement pattern 2 (302), the orientations of objects arranged on the same shelf are the same, the orientations of objects vary depending on the shelf on which the objects are arranged, and a gap is present between certain objects arranged on each shelf. In an arrangement pattern 3 (303), the orientations of objects arranged on the same shelf are different from those of other objects arranged on the shelf. The arrangement patterns are based on the type of the objects. In a distribution warehouse, the shapes, sizes, and barycentric positions of boxes (objects) storing therein products may vary even when the products are the same. In this case, it is regarded that the types of the objects are different.

In the present embodiment, data indicative of the shapes and the like of objects is stored in the object information database 144 and data indicative of arrangement patterns of objects are stored in the object arrangement database 145, both of which are based on the types of the objects. In a distribution warehouse, a certain product may be placed in a rack other than a predetermined rack since the number of products to be warehoused or the number of products to be delivered suddenly changes. In this case, identifications of the types of objects, i.e., updating of the data stored in the object information database 144 and the data in the object arrangement database 145 is performed by manually inputting data from an external or based on product IDs read by a RFID reader or barcode reader or on object images acquired by a camera.

Figure 9:
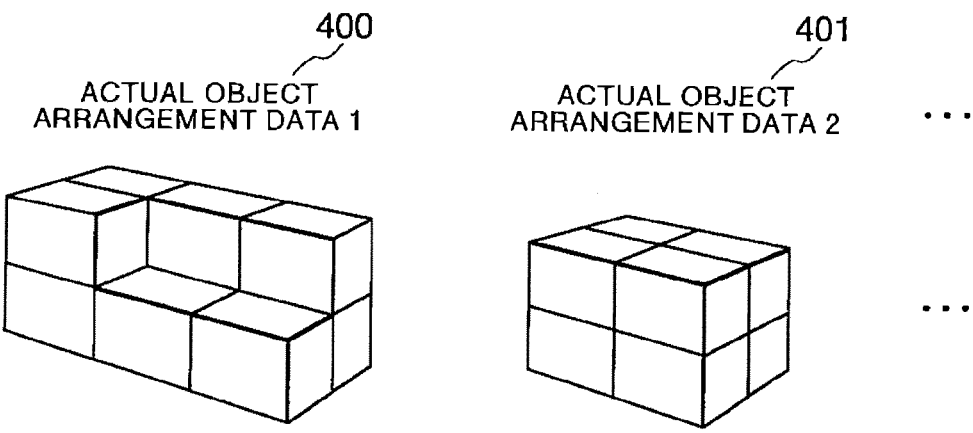
FIG. 9 is a diagram showing an example of actual object arrangement data.

The actual object arrangement data 146 indicates an actual arrangement of an object(s). FIG. 9 shows an example of the actual object arrangement data 146. An arrangement pattern stored in the object arrangement database 145 is referenced based on the type of objects. The actual object arrangement data 146 indicating the actual arrangement of the object(s) is formed based on the integrated data obtained using the actual measurement data (range data) obtained by the sensor 3. FIG. 9 shows object arrangement data 1 (400) indicative of objects of a certain type and object arrangement data 2 (401) indicative of objects of another type. A coordinate system (with its original point and directions of x axis, y axis and z axis) of the object arrangement data 1 (400) and a coordinate system (with its original point and directions of x axis, y axis and z axis) of the object arrangement data 2 (401) may be local coordinate systems that are different from each other, as described above.

In a distribution warehouse, multiple racks may be arranged and assigned to the respective types of objects. In other case, pallets each mounting thereon products (objects) of the same type may be placed in the same rack. In the former case, the object arrangement data is provided for each rack based on the type of objects. In the latter case, the object arrangement data is provided for each pallet. When the actual arrangement of products placed in a rack or on a pallet can be detected, the number of the products can be automatically counted. Processing for counting the number of products for each operation for recognizing an arrangement of the products is described later.

Figure 10:
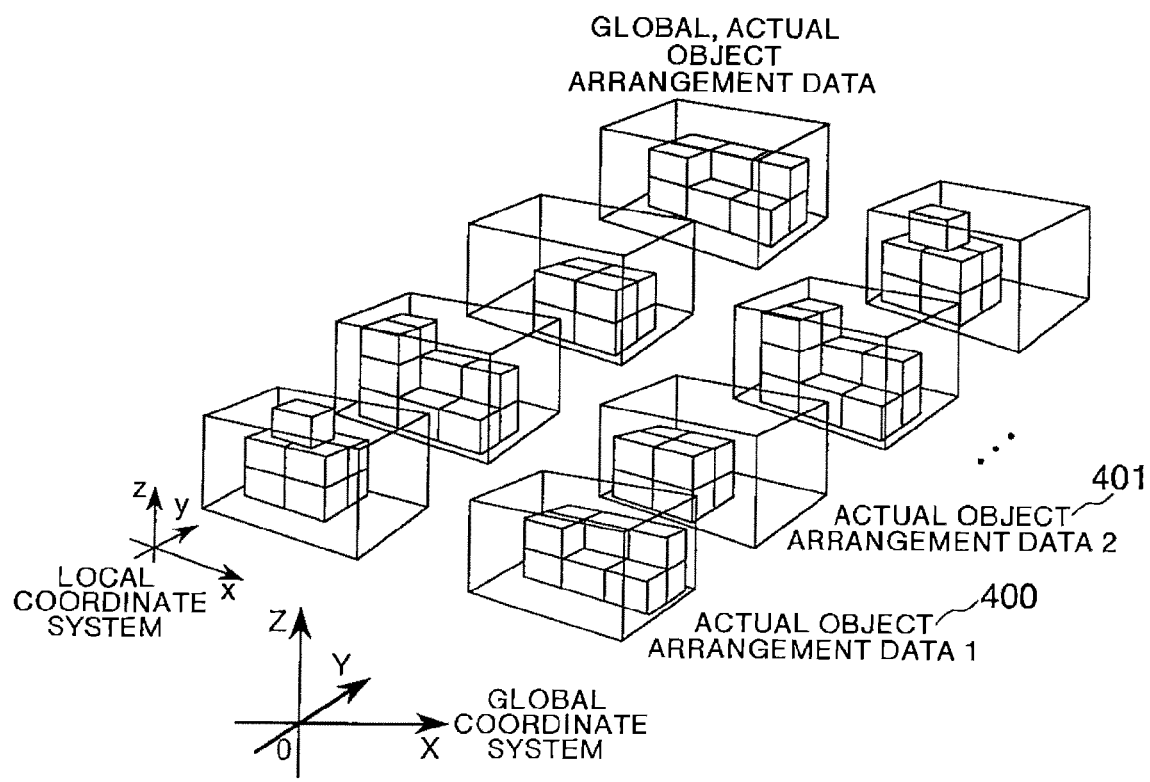
FIG. 10 is a diagram showing an example of global actual object arrangement data.

The global actual object arrangement data 147 indicates a position of an object in the three-dimensional space. FIG. 10 shows an example of the global actual object arrangement data 147. The global actual object arrangement data 147 is formed by converting the object arrangement data represented in the local coordinate system(s) based on the type of objects into data represented in the global coordinate system that is a three-dimensional coordinate system. The global actual object arrangement data 147 indicates the position(s) of the object(s) in the three-dimensional space. As shown in FIG. 10, the global actual object arrangement data 147 indicates object positions at which the actual object arrangement data based on the type of objects is arranged in the three-dimensional space.

For a distribution warehouse, the actual object arrangement data 146 indicates how objects are arranged on a pallet or in a rack. On the other hand, the global actual object arrangement data 147 indicates an actual position of objects on a pallet or in a rack placed in a distribution warehouse that is a three-dimensional space.

The present embodiment is not limited to the two levels of the local and global coordinate systems. The present embodiment may be applied to three or more levels of coordinate systems, depending on target objects. That is, coordinate conversion may be repeated to calculate an arrangement of objects. In addition, the global coordinate system may be used without a local coordinate system to specify an actual arrangement of objects. In this case, two levels of coordinate systems are not provided.

Figure 11:
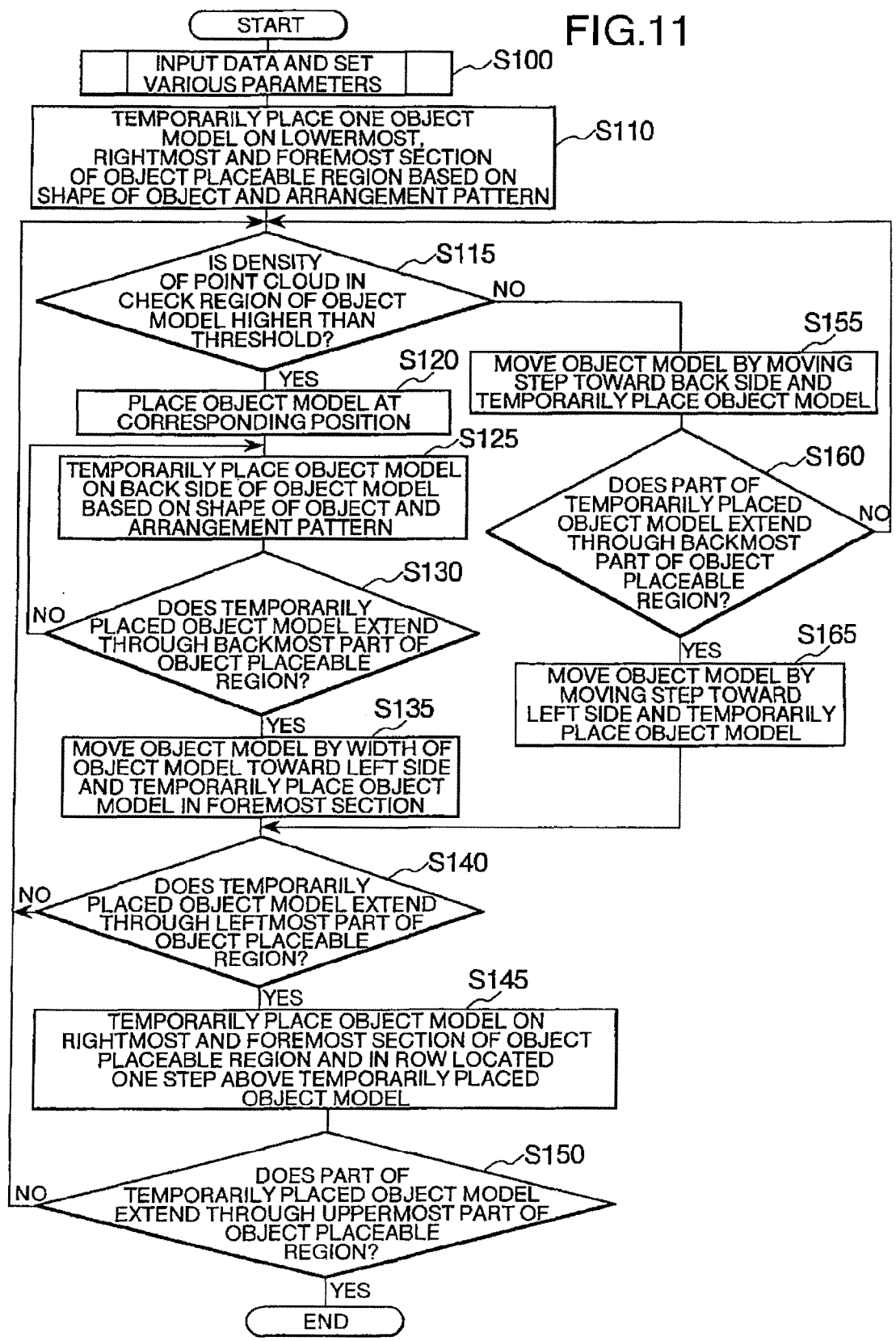
FIG. 11 is a flowchart of a process performed by an object comparison calculator.

FIG. 11 is a flowchart of a process performed by the object comparison calculator 133. In the comparison process, a three-dimensional object model that may be present in an object placeable region (described later) is temporarily placed in the object placeable region set in the integrated data 143 in accordance with an arrangement pattern stored in the object arrangement database 145, and whether or not an actual object is present is determined based on the density of point cloud on the surface of the object model. It is assumed here that the shape of each of objects is a rectangular parallelepiped that is a typical shape of an object used in the distribution field and that the objects are regularly arranged in accordance with the arrangement pattern stored in the object arrangement database 145. In addition, the following describes the objects that can be counted when the objects are viewed from a front side (it is assumed that all the objects that cannot be viewed from the front side are present). The front side means the side on which the sensor 3 measures the objects. In general, an object is taken out of a rack located in a distribution warehouse from an upper side and the front side. Thus, all objects (whose outlines cannot be detected by the sensor 3 due to the objects present on the front side) that cannot viewed from the front side are present.

Figure 12:
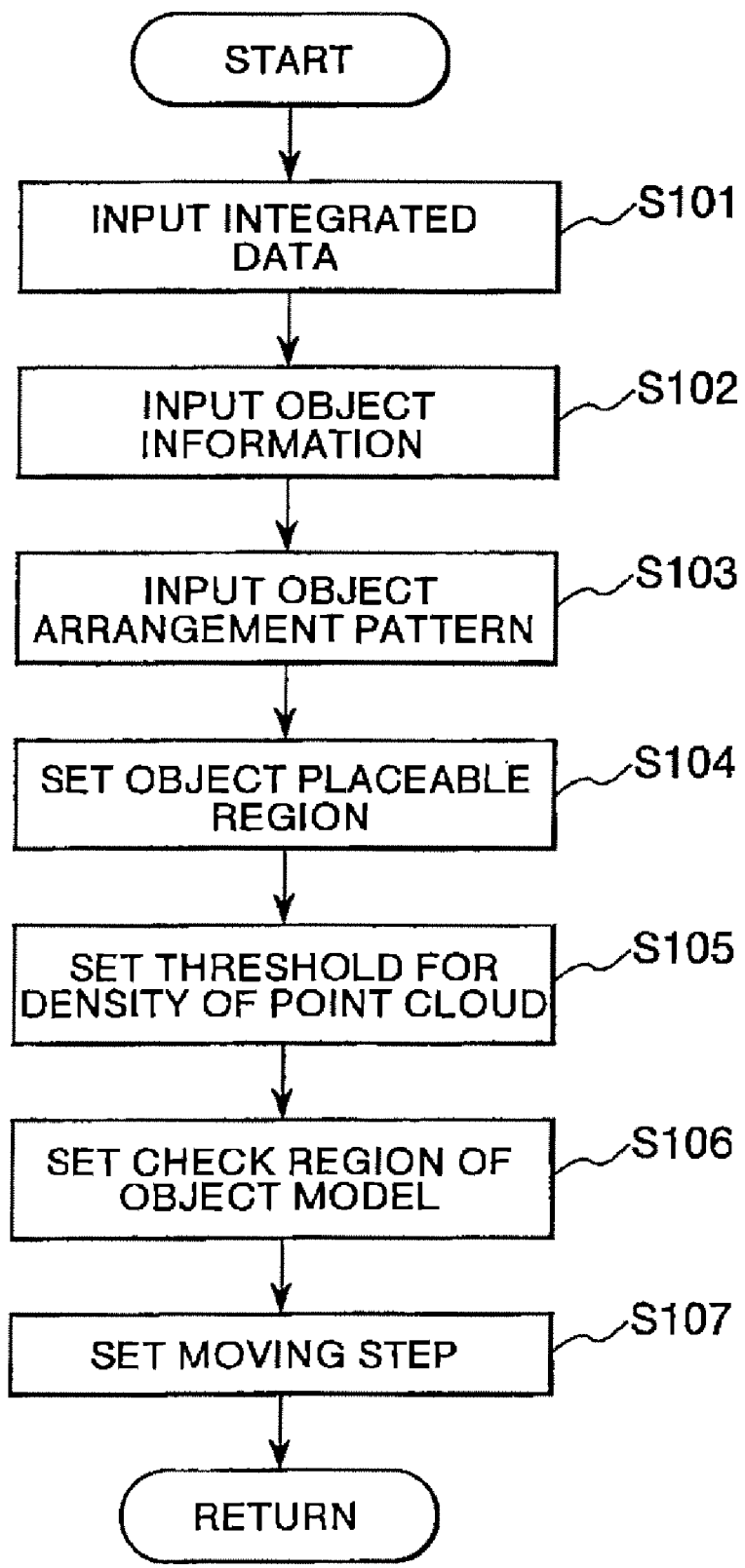
FIG. 12 is a flowchart of a process for setting various parameters.

First, the object comparison calculator 133 receives data of various types and sets various parameters in step S100. FIG. 12 is a flowchart of a process for setting the various parameters. The object comparison calculator 133 receives the integrated data 143 that is formed by integrating the sensor data 141, in step S101. A coordinate system of the integrated data 143 may be a local coordinate system which is different from a coordinate system of the object placeable region (described later) or the like. In such a case, either the coordinate system of the integrated data 143 or of the object placeable region is converted into either one of the coordinate system so that each coordinate system to be the same one. The object comparison calculator 133 receives object information (indicating the shape, size and the like of the object) from the object information database 144 in step S102. In addition, the object comparison calculator 133 receives an object arrangement pattern data from the object arrangement database 145, in step S103.

Next, the object comparison calculator 133 sets a region (object placeable region) in which the objects of a target type (which are represented in the inputted integrated data 143) are placed, in step S104. For example, when the objects are placed on a shelf, the set object placeable region (spatial region) is represented by the width, depth, and a height of the shelf. As described with reference to the object information database 144 shown in FIG. 7, a rack number is specified based on the type of objects present in the rack. Thus, for the object placeable region, the size of the spatial region that is based on the rack number is pre-stored in the computer 1. When the spatial region is represented in the global coordinate system and stored in the computer 1, the width, depth and height of the spatial region are calculated based on coordinate values representing the spatial region. Alternatively, the coordinate values representing the spatial region are converted into data represented in the coordinate system in which the integrated data 143 is represented. Alternatively, the coordinate values representing the integrated data 143 are converted into data represented in the global coordinate system in which the spatial region is represented. As described above, the sensor 3 measures the outline of a rack and the outline of a pallet. Therefore, to recognize the rack and the pallet from the integrated data 143, it is not necessary to perform coordinate conversion, since the rack and the pallet are represented in the same coordinate system.

The object comparison calculator 133 sets a threshold for the density of point cloud on the surface of the object model to determine whether or not an object is present, in step S105. Then, the object comparison calculator 133 sets a check region of the surface of the object model in step S106. The check region indicates a region in which the density of the point cloud is investigated (measured). The object comparison calculator 133 then sets a moving step, in step S107. The moving step indicates a moving distance of the object model in order to match the object model with data on the point cloud. The threshold for the density of the point cloud, the check region, and the moving step of the object model are stored in the computer 1 based on the types of the objects in a similar way to the other parameters. Alternatively, those may be stored as items of the object information database 144. The threshold for the density of the point cloud, the check region, and the moving step of the object model are described below with description of processing using the threshold, the check region and the moving step.

Since the flowchart shown in FIG. 11 indicates the process on one type of objects, the process (shown in FIG. 12) for setting parameters is performed on the type of the objects. To perform the process (of the flowchart shown in FIG. 11) on many types of objects placed in a rack, the type 201 of the object information database 144 is sequentially switched.

Referring back to FIG. 11, the object comparison calculator 133 temporarily places one object model in the lowermost, foremost and rightmost section of the set object placeable region based on the shape of the object and the arrangement pattern, in step S110. When the type 201 of the object model is 1, the shape, width, depth and height of the object model are a rectangular parallelepiped, X1, Y1 and Z1, respectively, as shown in FIG. 7.

Then, the object comparison calculator 133 determines whether or not the density of the point cloud in the check region of the temporarily placed object model is higher than the threshold, in step S115. When the shape of the object model is a rectangular parallelepiped, the following number of points is counted: the number of points represented by the integrated data 143 and arranged in one third or the like of the check region in the direction of the depth of the rectangular parallelepiped (from a front surface of the rectangular parallelepiped to a back surface of the rectangular parallelepiped). Then, the object comparison calculator 133 determines whether or not the number of the points is larger than the set threshold (for example, whether or not the number of the points is larger than 100). As shown in FIG. 4C, at least the rectangular front surface of the present object can be viewed based on the integrated data 143. In addition, one rectangular side surface and rectangular top surface of the object can be viewed depending on the arrangement (or depending on a direction of measurement by the sensor 3) based on the integrated data 143. Since the integrated data 143 indicates the outline of the object, when the shape of the object is a rectangular parallelepiped, the range data (point cloud) indicative of the front surface is different from the range data (point cloud) indicative of the side surface. A point(s) of the difference is included in the check region. When the shape of the object is conical, it is preferable that the check region be set and include point cloud arranged on a curved surface including an apex. The threshold for the density of the point cloud is set based on the moving speed of the moving mechanism 2 and an interval (measurement interval) between the points (range data). In other words, the moving speed of the moving mechanism 2 and the measurement interval of the range data obtained by the sensor 3 are controlled such that the density of the point cloud (that allow the presence of the object to be recognized) is obtained based on the set threshold.

When the density of the point cloud is higher than the threshold, the object comparison calculator 133 determines that an object corresponding to the object model is present at the position of the temporarily placed object model. Then, the object comparison calculator 133 (duly) places an object model at the position of the temporarily placed object model and counts the number of objects, in step S120. A counter for counting the number of objects is not described. The counter is initialized in a part of step S100 of setting parameters. The object comparison calculator 133 temporarily places an object model on the back side of the (duly) placed object model, in step S125. The object comparison calculator 133 determines whether or not at least a part of the temporarily placed object model extends through the backmost part of the object placeable region (or is placed outside the object placeable region on the back side of the object placeable region), in step S130. When the temporarily placed object model extends through the backmost part of the object placeable region, an object corresponding to the object model is placed at the position of the temporarily placed object model. Thus, the process proceeds back to step S120 to (duly) place an object model. The object comparison calculator 133 can recognize an object (whose outline cannot be detected by the sensor 3) placed on the back side by repeating steps S120 and S125 and can place an object model. In this way, the object comparison calculator 133 can recognize objects arranged on a certain shelf from the front side to back side of the object placeable region, and count the number of present objects.

When at least a part of the temporarily placed object model extends through the backmost part of the object placeable region, the object comparison calculator 133 moves the object model by the width of the object model and temporarily places the object model in the foremost section, in step S135. The object comparison calculator 133 then determines whether or not at least a part of the temporarily placed object model extends through the leftmost part of the object placeable region, in step S140. When the temporarily placed object model does not extend through the leftmost part of the object placeable region, the process proceeds back to step S115 to confirm whether or not all objects arranged in one column (from the position of the temporarily placed object model in the direction of the depths of the objects) are present.

When at least a part of the temporarily placed object model extends through the leftmost part of the object placeable region, the object comparison calculator 133 references the arrangement pattern received from the object arrangement database 145, and temporarily places an object model in the rightmost and foremost section of the object placeable region and in a row located one step above the temporarily placed object model in step S145. When the orientations of objects included in one row vary depending on the row, the object comparison calculator 133 changes the orientation of the object model and temporarily places the object model, in step S145, as shown by the arrangement pattern 1 (301) and the arrangement pattern 2 (302) depicted in FIG. 8. The object comparison calculator 133 determines whether or not at least a part of the temporarily placed object model extends through the uppermost part of the object placeable region, in step S150. When the temporarily placed object model does not extend through the uppermost part of the object placeable region, the process proceeds back to step S115 to confirm whether or not all objects arranged in one column (from the position of the temporarily placed object model in the direction of the depths of the objects) are present. When at least a part of the temporarily placed object model extends through the uppermost part of the object placeable region, the process shown in FIG. 11 is terminated.

Next, when the density of the point cloud in the check region of the temporarily placed object model is not higher than the set threshold, the object comparison calculator 133 determines that an object corresponding to the object model is not present at the position of the temporarily placed object model, in step S115. Then, the object comparison calculator 133 moves the object model toward the back side by the moving step set in step S107 and temporarily places the object model, in step S155. The moving step in the depth direction is used to recognize an object placed at a location shifted from a predetermined location in the direction of the depth of the object placeable region. The object comparison calculator 133 determines whether or not at least a part of the temporarily placed object model extends through the backmost part of the object placeable region in step S160. When the temporarily placed object model does not extend through the backmost part of the object placeable region, the process proceeds back to step S115 to confirm whether or not an object corresponding to the object model is present at the position of the temporarily placed object model.

When at least a part of the temporarily placed object model extends through the backmost part of the object placeable region, the object comparison calculator 133 moves the object model toward the left side by the moving step set in step S107 and temporarily places the object model in the foremost section, in step S165. The process proceeds to step S140 to determine whether or not at least a part of the temporarily placed object model extends through the leftmost part of the object placeable region.

The length of the moving step in the depth direction and the length of the moving step in the left-right direction may be the same or different from each other. However, when the moving steps are too small, the time for processing of the computer 1 is long. Therefore, it is preferable that the moving steps be determined based on the sizes of objects and the size of the object placeable region. For example, when an object is not present in the lowermost, rightmost and foremost section of the object placeable region and the object comparison calculator 133 moves the object model step-by-step by the moving step in the depth direction from the foremost section, the object comparison calculator 133 cannot recognize the presence of the object by means of the number of (the depth of the object)/(the moving step in the depth direction), in step S115.

The integrated data 143 obtained based on the range data measured by the sensor 3 is represented by coordinate values indicating an irregularity (outline) of the surface of an object. Accordingly, when the object model is temporarily placed, the coordinate values indicating the outline of the object does not necessarily match coordinate values indicating the object model. When the coordinate values indicating the outline of the object is slightly different from and does not match the coordinate values indicating the object model, the object comparison calculator 133 may determine that the density of the point cloud is not higher than the threshold, in step S115. Thus, the point cloud is not detected by the matching of the two sets of the coordinate values. Therefore, an allowable range is set for the coordinate values indicating the object model, and point cloud included in the allowable range is detected. That is, the object comparison calculator 133 moves an object model around the position of the temporarily placed object model in a front-back direction (depth direction) and a left-right direction (width direction) within the allowable range. Then, the object comparison calculator 133 compares the number of the points detected during the movement of the object with the threshold.

It is preferable that the allowable range be equal to or larger than the length of the moving step. For example, when the moving step in the depth direction is 4 cm, if the allowable range is set to 4 cm (−2 cm to +2 cm) with the position of the temporarily placed object model as its center, the point cloud can be completely detected (all the points can be detected).

In this way, the object comparison calculator 133 is capable of recognizing the presence of the objects placed at the positions of the object model placed in step S120 and counting the number of the objects.

In the above description, the object comparison calculator 133 temporarily places the object model from the front side to the back side, from the right side to the left side, and from the lower side to the upper side to confirm whether or not objects are present based on the density of point cloud. The object comparison calculator 133 may temporarily place the object model from left side to the right side and from the upper side to the lower side.

In the aforementioned process, the object model is shifted step by step to be applied to data indicative of point cloud.

Thus, even when an object is shifted from an ideal position, the object comparison calculator 133 can calculates the actual arrangement of the object.

Figure 13:
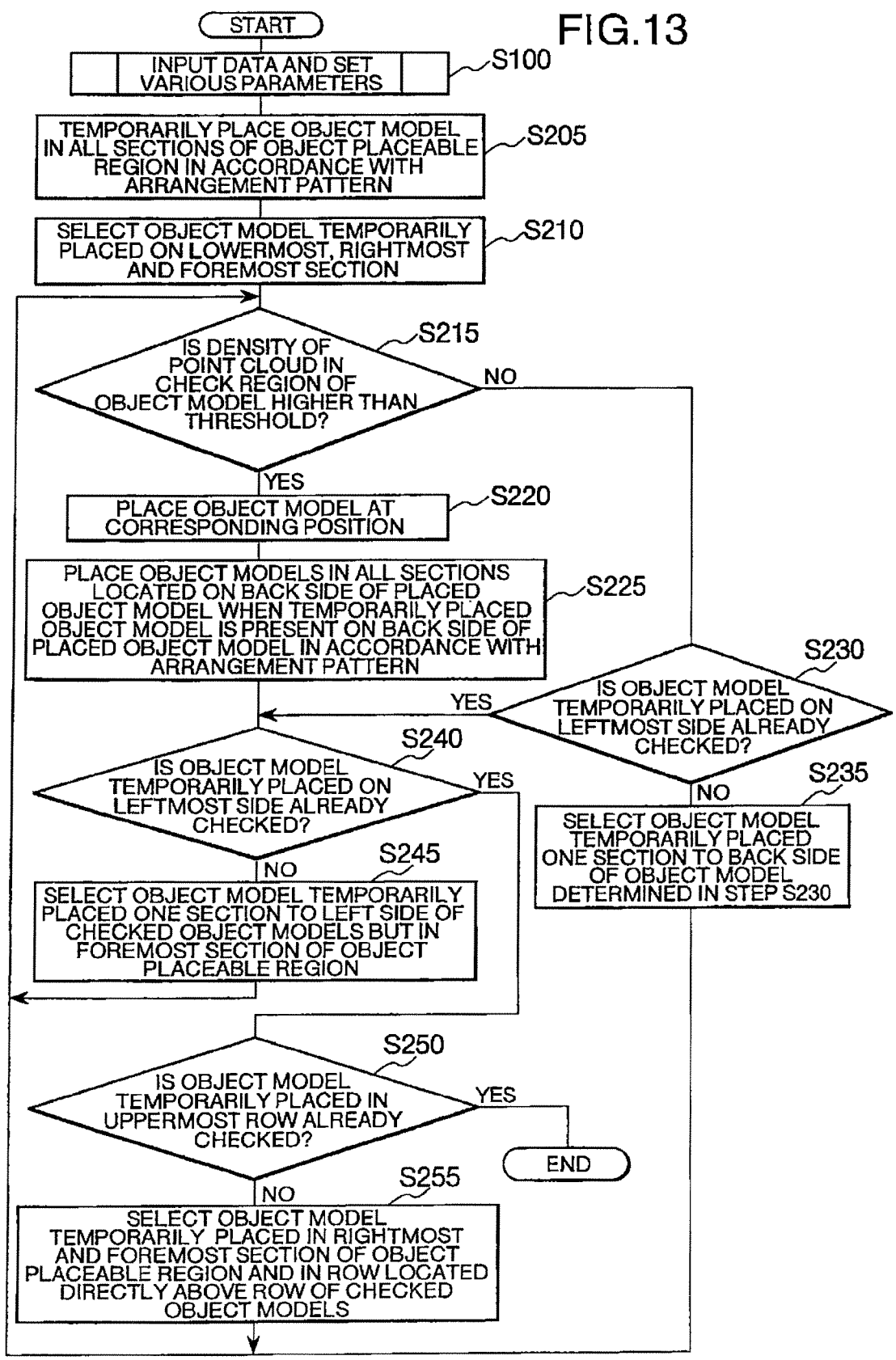
FIG. 13 is a flowchart of another process performed by the object comparison calculator.

FIG. 13 is a flowchart of another process performed by the object comparison calculator 133. The comparison process is firstly performed by temporarily placing a three-dimensional object model in all sections of the object placeable region represented by the integrated data 143, and then determining whether or not objects are present based on the densities of groups of points of the object model. The object comparison calculator 133 performs the process shown in FIG. 13 for each of the types of objects, like the process shown in the flowchart of FIG. 11. In the process shown in FIG. 13, all objects that cannot be viewed from the front side are present, and an allowable range used to detect point cloud is set, in a similar way to the process shown in the flowchart of FIG. 11.

The object comparison calculator 133 receives various data and sets various parameters, in step S100 as described with reference to FIG. 12. However, step S107 shown in FIG. 12 is not necessary for the process shown in FIG. 13.

The object comparison calculator 133 references the arrangement pattern data received from the object arrangement database 145 and classified based on the types of objects, and temporarily places object models in all sections of the object placeable region (such that the object placeable region is full of objects), in step S205. The object comparison calculator 133 selects the object model temporarily placed on the lowermost, rightmost and foremost section of the object placeable region as a target to be checked, in step S210. The object comparison calculator 133 then determines whether or not the density of point cloud in the check region of the selected object model is higher than the threshold, in step S215. When the object comparison calculator 133 determines that the density of the point cloud in the check region of the selected object model is higher than the threshold, the object comparison calculator 133 places the object model at the corresponding position, in step S220. The processing for determining whether or not the density is higher than the threshold in step S215 is called check. When the object comparison calculator 133 (duly) places the object model, the object comparison calculator 133 counts the number of objects in the same way as the process shown in FIG. 11. When the temporarily placed object model is present on the back side of the (duly) placed object model (or when the temporarily placed object model is not located on the backmost side of the object placeable region), the object comparison calculator 133 (duly) places object models in all sections located on the back side of the (duly) placed object model and in the same column as that of the temporarily placed object model in accordance with the arrangement pattern, in step S225. In this case, the object comparison calculator 133 counts the number of objects based on the arrangement of the object models. The arrangement of the object models depends on the arrangement pattern, and the dependence is described later.

When the object comparison calculator 133 determines that the density of the point cloud in the check region of the selected object model is not higher than the threshold, the object comparison calculator 133 determines whether nor not the object model temporarily placed in the backmost section of the object placeable region and in the same column as that of the selected object model is already checked, in step S230. When the object comparison calculator 133 determines that the object model is not yet checked in step S230, the object comparison calculator 133 selects the object model temporarily placed one section to the back side of the object model determined in step S230, in step S235. The process then proceeds back to step S215.

When the object comparison calculator 133 performs step S225 or step S230 and terminates the processing on the object models arranged in one column and in the depth direction, the object comparison calculator 133 determines whether or not the object model temporarily placed in the leftmost section of the object placeable region is already checked, in step S240. When the object comparison calculator 133 determines that the object model temporarily placed in the leftmost section of the object placeable region is not yet checked in step S240, the object comparison calculator 133 selects the object model temporarily placed one section to the left side of the checked object models and in the foremost section of the object placeable region, in step S245. The process then proceeds back to step S215. When the object comparison calculator 133 determines that the object model temporarily placed in the leftmost section of the object placeable region is already checked in step S240 (or when all the objects placed in the row are checked), the object comparison calculator 133 determines whether or not the object models temporarily placed in the uppermost row are already checked, in step S250. When the object comparison calculator 133 determines that the object models temporarily placed in the uppermost row are not yet checked, the object comparison calculator 133 selects the object model temporarily placed in the rightmost and foremost section of the object placeable region and in a row located directly above the row of the checked object models, in step S255. The process then proceeds back to step S215. When the object comparison calculator 133 determines that the object models temporarily placed in the uppermost object layer are already checked, this all the object models temporarily placed in the object placeable region are already checked. The process shown in FIG. 13 is terminated.

Figure 14:
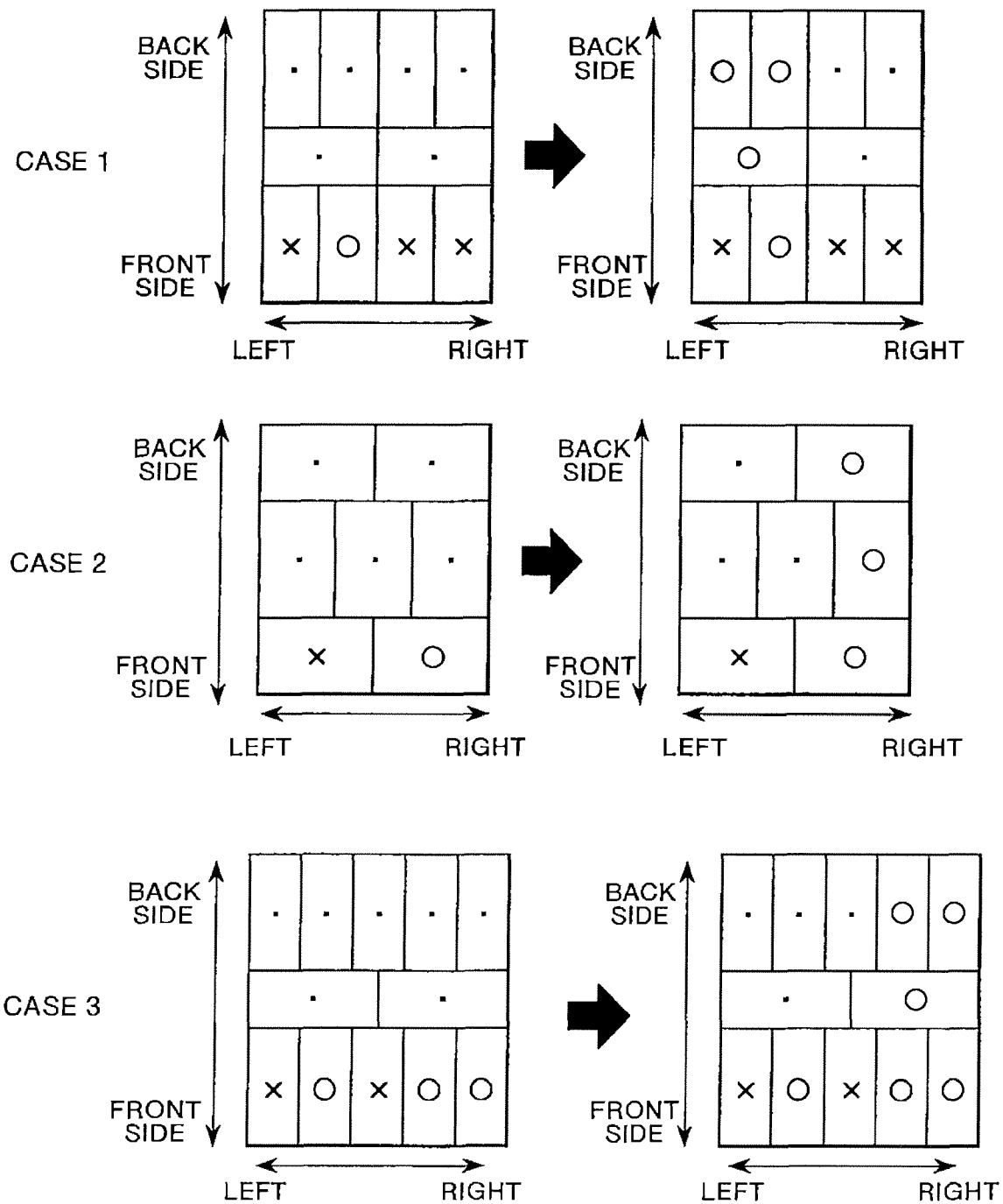
FIG. 14 is a diagram showing a method for placing an object model on the front, central and back sides of an object placeable region.

FIG. 14 is a diagram showing the method for arranging the object models in the depth direction of the object placeable region in step S225 shown in FIG. 13. The method for arranging object models in a certain row is described below. Each of white circles shown in FIG. 14 means a region in which an object is determined to be present and in which an object model is placed. Each of crosses shown in FIG. 14 means a region in which an object is determined to be absent. Each of dots shown in FIG. 14 means a region in which a presence of an object is not yet checked and in which an object model is temporarily placed.

FIG. 14 shows cases 1 to 3. The case 1 is an example in which the object comparison calculator 133 determines that an object is present only in the foremost section (or in the first row) and in the third section from the right side of the object placeable region. The object comparison calculator 133 checks sections located in the second row (or on the back side of the first row), and then places an object model in the second row such that the object model is in contact with the object model placed in the first row and in the third section from the right side. The object comparison calculator 133 then checks sections located in the third row (or on the back side of the second row). The object comparison calculator 133 then places object models in the third row such that the object models are in contact with the object model present in the second row.

The case 2 shown in FIG. 14 is an example in which an object model temporarily placed at the center of the second row contacts a half of the surface of an object model located on the right side of the first row. A contact rate necessary to place an object model on the back side of an object is pre-specified. For example, when the contact rate is equal to or larger than ⅔, a contact portion of the object model temporarily placed at the center of the second row is not sufficient. Thus, the object model is not placed at the center of the second row. An object model temporarily placed on the right side of the third row is to be in contact with two third of the surface of the object model temporarily placed on the right side of the second row. Thus, the object model is placed on the right side of the third row.

The case shown in FIG. 14 is an example in which the object comparison calculator 133 determines that objects are present in the first, second and fourth sections of the first row from the right side of the first row. The objects present in the first and second sections of the first row are in contact with four fifth of the surface of an object temporarily placed on the right side of the second row. Thus, the object is placed on the right side of the second row.

According to the flowchart shown in FIG. 13, the object comparison calculator 133 temporarily places three-dimensional object models in all parts of the object placeable region in accordance with the arrangement pattern based on the type of objects, and determines whether or not objects are present based on the density of point cloud on the surface of each of the three-dimensional object models. Thus, the comparison process can be applied to a complicated arrangement pattern in which the orientations of objects vary depending on the row in which the objects are present.

The object comparison calculator 133 may selectively perform the process described with reference to FIG. 11 or the process described with reference to FIG. 13 based on the arrangement pattern, to generate the actual object arrangement data 146 and count the number of objects. The computer 1 may output the generated actual object arrangement data 146 and the counted number to a display device and the like. For inventory of products placed in a distribution warehouse, the generated actual object arrangement data 146 and the counted number may be used as data to be compared with account data.

In the description of the object comparison calculator 133, it is assumed that the object placeable region is a rectangular parallelepiped region (with a width, height and depth) such as a space in a rack used in a distribution warehouse. The number of products (of a certain type) to be warehoused in or delivered from a distribution warehouse may be suddenly changed. Thus, products of a certain type are placed in a rack and on the left side of the rack, and products of another type are placed in the rack and on the right side of the rack in some cases. In addition, products of a certain type are placed on a shelf of a rack and products of another type are placed on another shelf of the rack in some cases. In those cases, a region (on a shelf) in which products are placed based on the type of the products is regarded as the object placeable region.

Figure 15A:
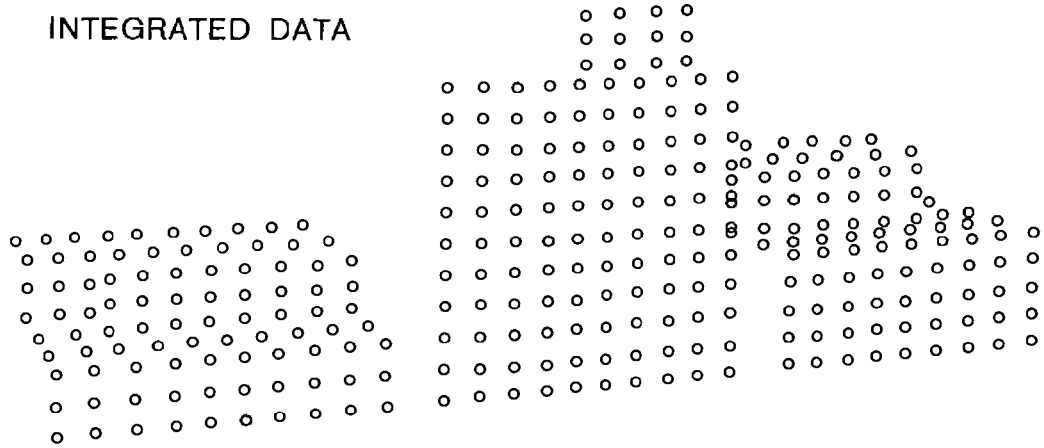
FIGS. 15A and 15B are diagrams each showing an example of an object comparison calculation using actual data.
Figure 15B:
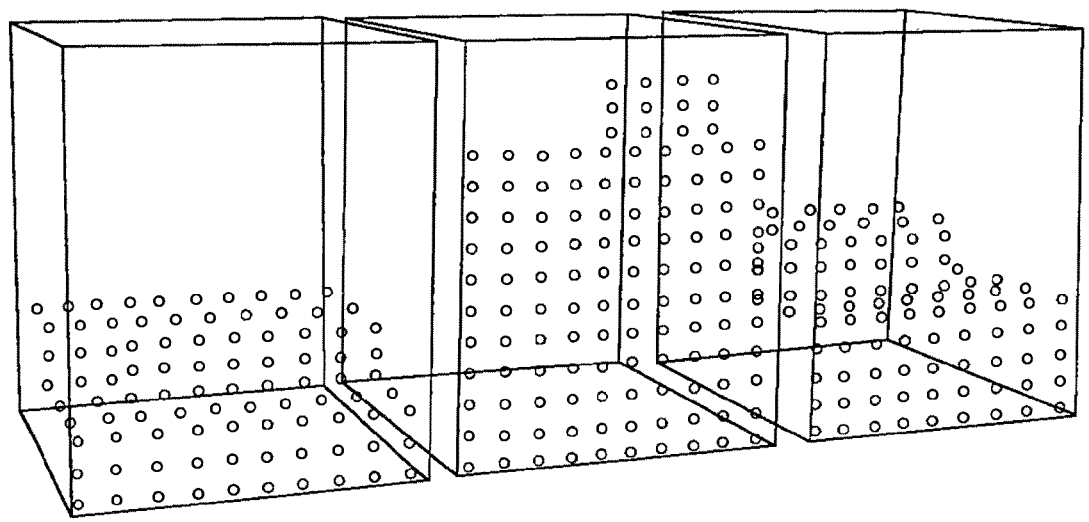
Figure 16A:
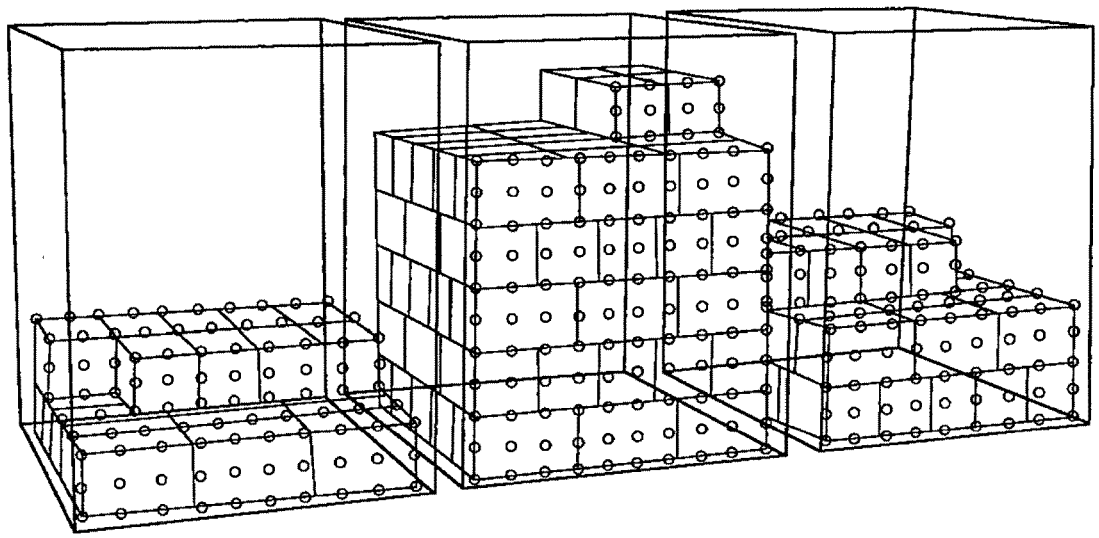
FIGS. 16A and 16B are diagrams each showing an example of the object comparison calculation using actual data.
Figure 16B:
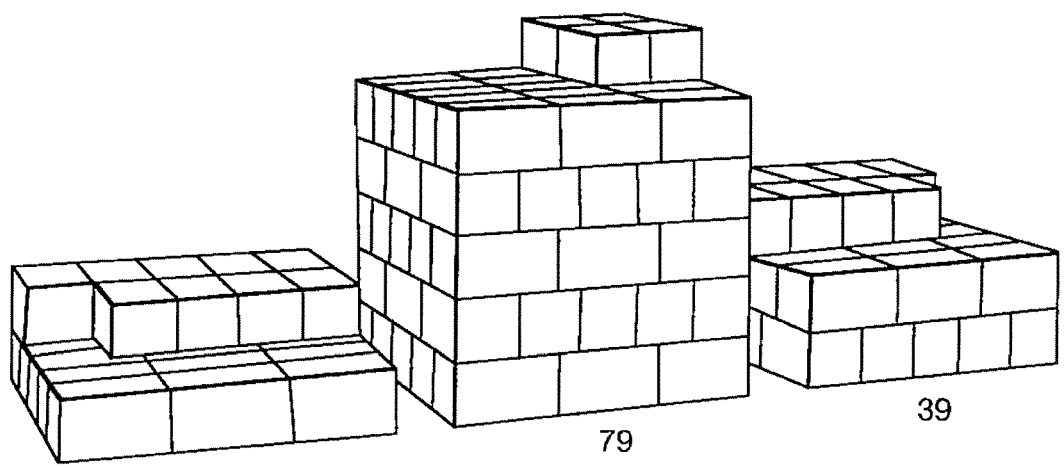

FIGS. 15A to 16B are diagrams each showing an example of an object comparison calculation performed based on actual data. The range data generated by the sensor 3 is indicated by circles shown in FIGS. 15A to 16A. FIG. 15A shows an example of the integrated data 143. FIG. 15B shows the object placeable region set in step S104 shown in FIG. 12. FIG. 16A shows the case where the object comparison calculator 133 applies object models to the integrated data. FIG. 16B shows the number of objects in the global actual object arrangement data 147.

Figure 17:
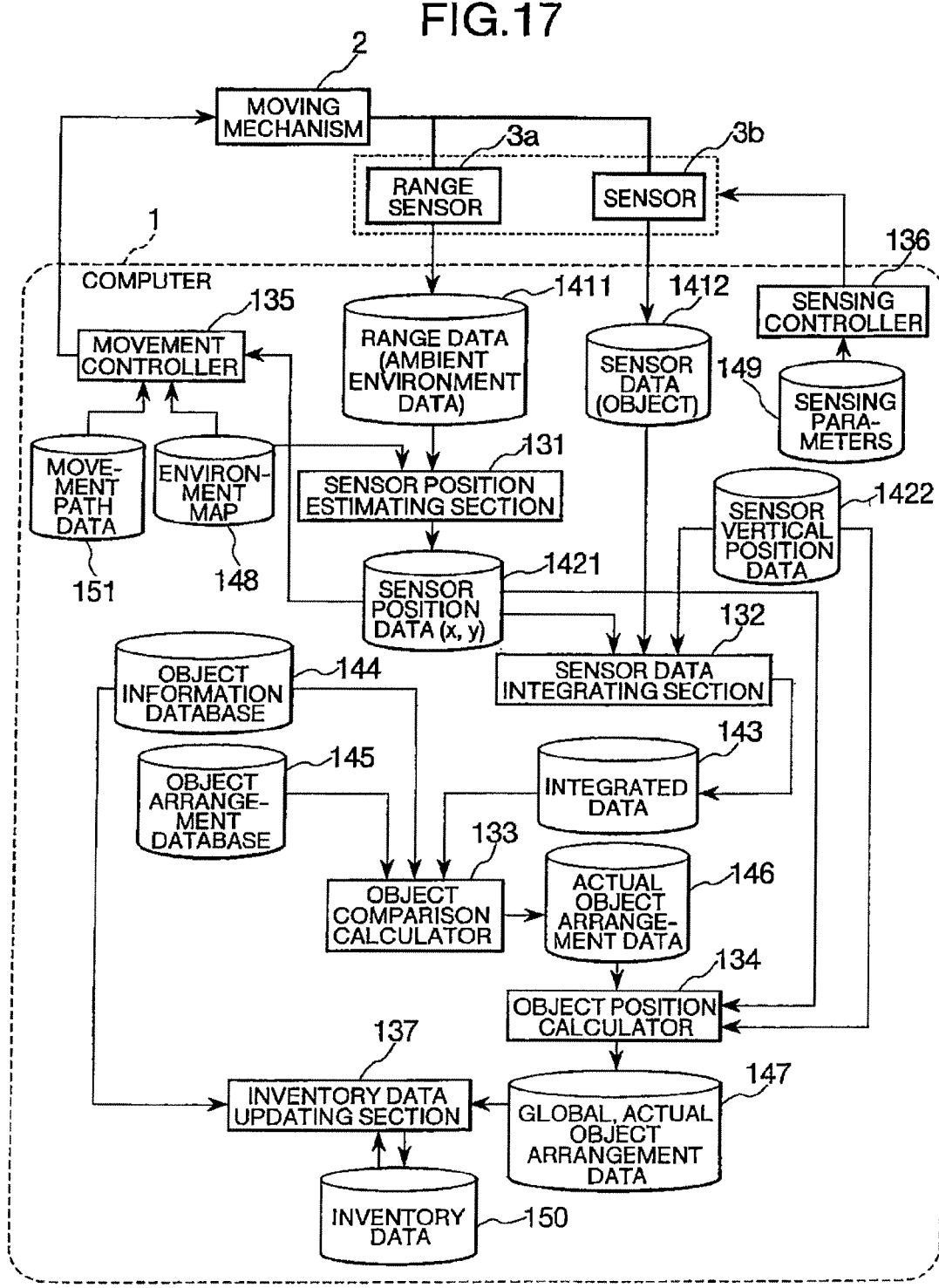
FIG. 17 is a functional block diagram of an inventory system that updates inventory data.

FIG. 17 is a functional block diagram of an inventory system that allows the moving mechanism to autonomously move (or automatically recognize an environment such as an obstacle, specify a path to a destination, and move according to the specified path) and can update a product inventory database for a distribution warehouse or the like.

The range sensor 3a and the sensor 3b are mounted on the moving mechanism 2. The range sensor 3a measures a distance between an ambient peripheral environment (object or the like) and the sensor 3a to generate data (current range data (peripheral environment data)) 1411. The sensor 3b measures an object to be sensed to generate data (sensor data) 1412.

A sensor position estimating section 131 matches the current range data (peripheral environment data) 1411 with data about an environment map 148 prepared beforehand by integrating range data about the ambient peripheral environment, to calculate the position of the range sensor 3a on the environment map 148, and output data (sensor position data) 1421 indicative of the position of the range sensor 3a. The position of the range sensor 3a, which is indicated by the sensor position data 1421, is represented by two-dimensional coordinate values (x, y) on the environment map 148. Since the range sensor 3a and the sensor 3b are mounted on the moving mechanism 2, the sensor position data 1421 also indicates the position of the moving mechanism 2, the position of the range sensor 3a and the position of the sensor 3b on the environment map 148. The method for creating the environment map 148 is as described above with reference to FIGS. 2 and 3.

A movement controller 135 receives the sensor position data 1421 and the environment map 148 having thereon data (movement path data) 151 indicative of a path in which the moving mechanism 2 moves. The movement controller 135 matches the sensor position data 1421 (indicative of the current position of the range sensor 3a) with the movement path data 151 to determine a moving direction of the moving mechanism 2 from the current position of the moving mechanism 2. The movement controller 135 then controls the moving mechanism 2 such that the moving mechanism 2 moves in the determined moving direction.

A sensing controller 136 controls the sensor 3b in accordance with sensing parameters 149 to cause the sensor 3b to measure an object and thereby to generate the sensor data 1412. A plurality of sensors 3b may be provided or multiple types of sensors may be provided. The computer 1 may simultaneously receive data from the plurality of sensors 3b. The sensing parameters 149 include an angular resolution at the time of the sensing operation, a frame rate, and a sensing distance as an example of parameters for the sensor 3b. For example, when a camera is used as the sensor 3b, the sensing parameters 149 include a frame rate, a shutter speed, a white balance, and an aperture. For another example, when an RFID reader is used as the sensor 3b, the sensing parameters 149 include a communication distance and a communication range. Furthermore, when the sensor 3b is attached to the edge of a robot arm, the sensing parameters 149 may include an operation (movement, rotation) of the sensor 3b.

After or during the movement of the moving mechanism 2 in accordance with the movement path data 147, the sensor data integrating section 132 integrates multiple pieces of the sensor data (object) 1412 measured at different locations by the sensor 3b in a single coordinate system based on multiple pieces of the two-dimensional sensor position data 1421 (indicative of the positions of the sensor 3a when the sensor 3a obtains the sensor data (object) 1412) and prestored sensor vertical position data 1422 (indicative of the vertical position of the sensor 3b at the time of the sensing operation). The sensor data integrating section 132 then outputs the integrated data 143.

The data flow from the object comparison calculator 133 to the object position calculator 134 is the same as that shown in FIG. 1.

An inventory data updating section 137 receives the global actual object arrangement data 147 output from the object position calculator 134, and data stored in the object information database 144 and indicating the types of objects, and updates inventory data 150 indicating the types, positions, numbers, and actual arrangements of objects.

Figure 18:
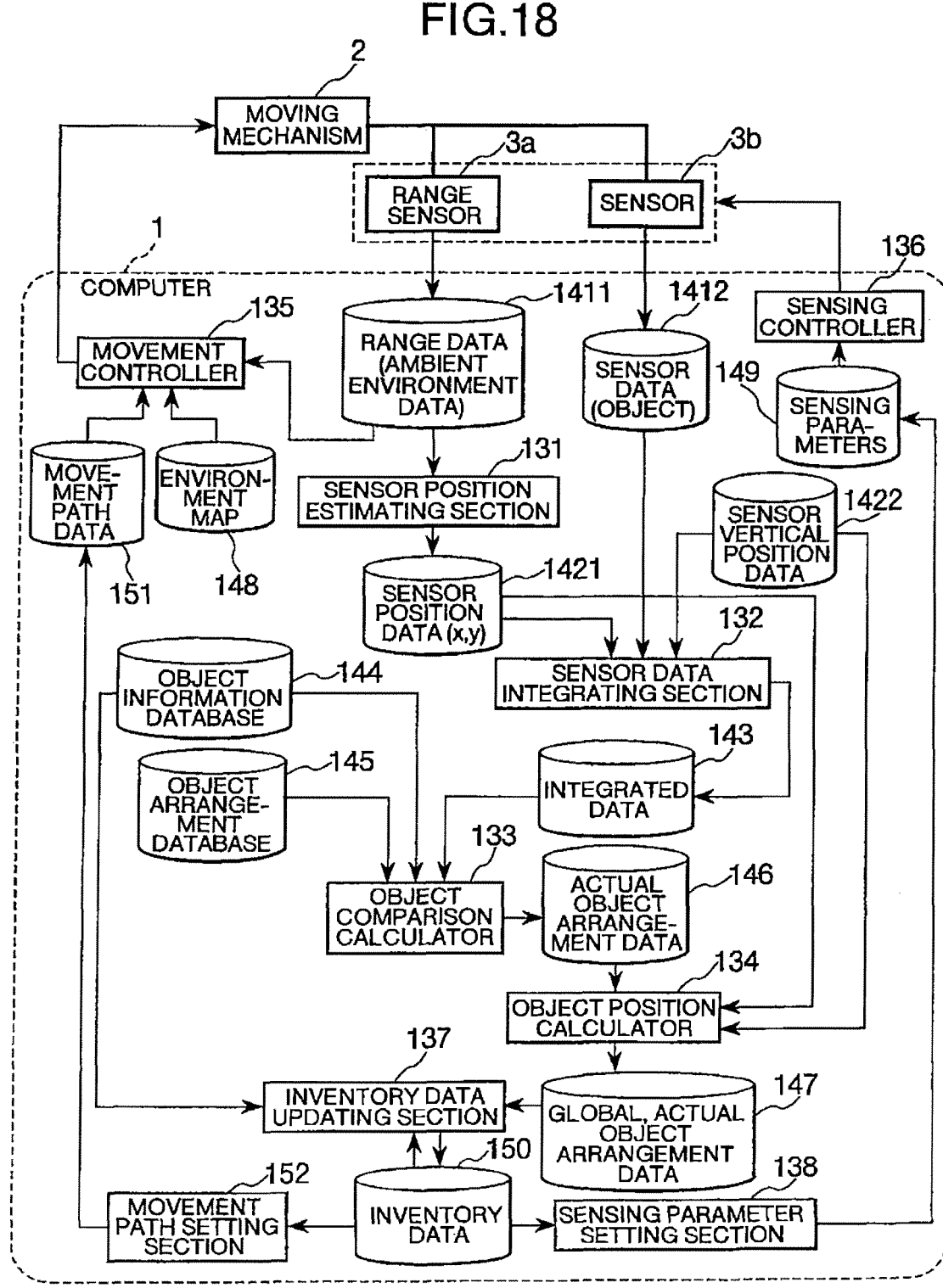
FIG. 18 is a functional block diagram of an inventory system having an information feedback function.

FIG. 18 is a functional block diagram of the inventory system (shown in FIG. 17) further including an information feedback function. The inventory system shown in FIG. 18 is formed by adding a movement path setting section 137 and a sensing parameter setting section 138 to the inventory system shown in FIG. 17.

Figure 20:
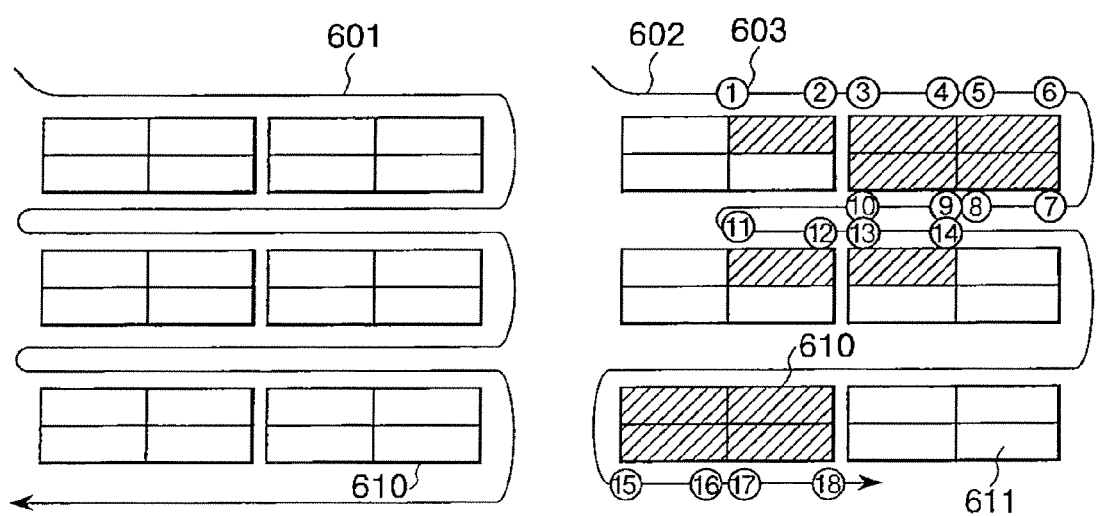
FIG. 20 is a diagram showing an example of a path for automatic inventory by an autonomous movement of the moving mechanism.

The movement path setting section 137 sets an optimal path for the next inventory based on object position information included in the inventory data 150. The movement path setting section 137 may specify multiple objects of which an inventory is needed to be made, and set the optimal path on which the moving mechanism 2 moves to check the specified objects. Alternatively, the movement path setting section 137 may set a path to make an inventory of objects present in a certain region. FIG. 20 shows examples of the path. The movement path setting section 137 may simultaneously set the moving speed of the moving mechanism 2 and the optimal path. For example, the movement path setting section 137 sets the moving speed of the moving mechanism 2 such that the moving mechanism 2 moves at a low speed in a region in which the sensing operation is necessary and moves at a high speed in a region in which the sensing operation is not necessary.

The sensing parameter setting section 138 sets sensing parameters based on an object to be sensed. For example, when a range sensor is used as the sensor 3b, necessary sensing accuracy varies depending on the size of an object to be sensed. Therefore, the frame rate or resolution for sensing a certain region of a large object may be reduced. On the other hand, the frame rate or resolution for sensing a certain region of a small object may be increased. A color adjustment of the camera may be performed based on brightness at a location at which an inventory is made. An infrared camera or laser sensor may be used in a dark region in which an inventory is needed to be made, instead of the camera. The sensing parameters may include the operation of the sensor 3b. For example, when the location at which the sensor 3b senses an object changes (or when the sensor 3b is attached to the edge of a robot arm and senses an object from the upper side of the object, not from the front side of the object) based on the shape of the object, the sensing parameters may include the operation of the sensor 3b.

The movement path and the sensing parameters may vary depending on the states of objects. Thus, the moving mechanism 2 may stop or move slowly only in a region in which the sensor 3b measures an object. This reduces the moving distance, the time for the movement and the time for the measurement. The sensing method may change depending on an object to be measured. The measurement is performed with a measurement parameter sufficient to recognize a target object and with a small amount of data in a short time. In addition, the sensor may be attached to a robot arm (having a high degree of freedom of motion) and measure an object at different angles to increase the amount of information necessary to recognize the object. Those operations increase the accuracy of the recognition. Thus, the optimal inventory can be realized.

Figure 19:
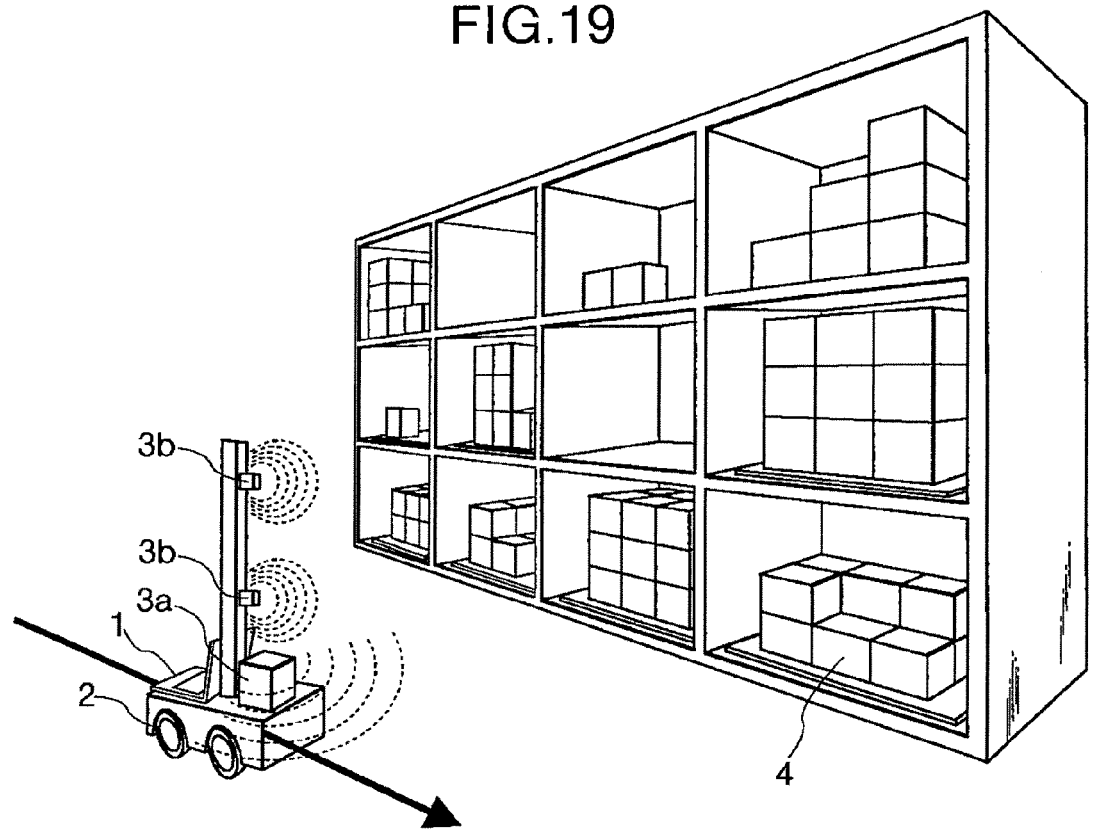
FIG. 19 is a diagram showing an example of the configuration of the inventory system shown in FIG. 17.

FIG. 19 is a diagram showing an example of the configuration of the inventory system shown in FIG. 17. The inventory system includes the moving mechanism 2, the range sensor 3a, the sensor 3b, and the computer 1 to measure products 4. The products 4 are placed in spaces of a rack. The moving mechanism 2 has an autonomous movement function. The range sensor 3a measures an ambient peripheral environment. The sensor 3b measures the states of the products 4. The computer 1 uses the sensors 3a and 3b to automatically make an inventory of the products 4 and controls the operation of the moving mechanism 2.

FIGS. 20A and 20B are diagrams each showing an example of the movement path for the automatic inventory by the autonomous movement of the moving mechanism. FIG. 20A shows an example of a movement path 601 for inventory of products placed in all racks 610.

FIG. 20B shows an example of a movement path 602 for inventory of products placed in some of racks. In the case shown in FIG. 20B, it is necessary to make an inventory of the products placed in the racks 610, while it is not necessary to make an inventory of products placed in racks 611. The movement path 602 is represented by numbers 603 surrounded by circles. An inventory can be efficiently made by setting the path based on whether or not an inventory is necessary.

According to the embodiment described above, the sensor moves and measures an object to generate data. A three-dimensional shape of the object is created based on the generated data and compared with object attributes (shape, arrangement pattern and the like) stored in the databases. The system is capable of recognizing the presences or absences of objects and counting the number of objects.

In addition, the three-dimensional object recognition system is capable of recognizing an arrangement of objects (products) placed in a warehouse and counting the number of the objects.

While we have shown and described the embodiment in accordance with our invention, it should be understood that the disclosed embodiment is susceptible of changes and modifications without departing from the scope of the invention. Therefore, we do not intend to be bound by the details shown and described herein but intend to cover all such changes and modifications within the ambit of the appended claims.

What is claimed is:

1. A three-dimensional object recognition system comprising:
    a sensor configured to measure a distance between the sensor and an object;
    a moving mechanism configured to move the sensor; and
    a computer connected with the sensor, the computer including:
        an object information database configured to store at least data indicative of the shape of the object;
        an object arrangement database configured to store data indicative of an arrangement pattern of the object;
        a sensor data integrating section configured to output integrated data indicative of the outline of the object by converting the measured data with the sensor while the moving mechanism is moving the sensor into three-dimensional coordinates represented in a single three-dimensional space; and
        an object comparison calculator configured to create an object model based on the data indicative of the shape of the object and stored in the object information database, reference the data indicative of the arrangement pattern of the object and stored in the object arrangement database, compare the created object model with the integrated data, and output actual object arrangement data indicative of an actual arrangement of the measured object.

2. The three-dimensional object recognition system according to claim 1, wherein the computer further includes an object position calculator configured to generate global actual object arrangement data indicative of the actual position of the object in a three-dimensional global space based on the sensor position data and the actual object arrangement data.

3. The three-dimensional object recognition system according to claim 2, wherein
the object position calculator is configured to output the global actual object arrangement data including the number of objects.

4. The three-dimensional object recognition system according to claim 3, wherein
the computer further includes a range data integrating section, a sensor position direction estimating section and a movement controller, the range data integrating section configured to create an environment map based on the sensor data generated by the sensor, the sensor position direction estimating section configured to estimate the position of the sensor on the environment map based on the sensor data and the environment map, the movement controller configured to control the moving mechanism based on the estimated position of the sensor and move the moving mechanism along a predetermined movement path.

5. The three-dimensional object recognition system according to claim 2, wherein
the object comparison calculator is configured to count the number of the objects.

6. The three-dimensional object recognition system according to claim 5, wherein
the object comparison calculator is configured to reference the arrangement pattern of the object and move the created object model, and when the density of point cloud that are represented by the integrated data and placed in a check region of the moved object model is higher than a threshold, the object comparison calculator is configured to determine that the object is placed at the position of the object model.

7. The three-dimensional object recognition system according to claim 5, wherein
the object comparison calculator is configured to temporarily place the created object model in accordance with the arrangement pattern of the object, and when the density of point cloud that are represented by the integrated data and placed in a check region of the created object model is higher than a threshold, the object comparison calculator is configured to determine that the object is placed at the position of the temporarily placed object model.

8. The three-dimensional object recognition system according to claim 2, further comprising another sensor configured to identify the position of the sensor that is moved by the moving mechanism.

9. The three-dimensional object recognition system according to claim 1,
wherein the sensor is configured to obtain range data, as point cloud, indicative of a distance between the sensor and the object and an angle formed between the measurement direction and a direction to which the object is placed, and
wherein the sensor data integrating section is configured to:
convert each point of the range data indicative of the distance and the angle into three-dimensional coordinates based on the position of the sensor when the sensor measures the object and the direction of the sensor, and
output all points of the range data as the three-dimensional coordinates represented in the single three-dimensional space.

10. An inventory system comprising:
a sensor configured to measure a distance between the sensor and an item in a warehouse;
a moving mechanism configured to move the sensor; and
a computer connected with the sensor, the computer including:
an object information database configured to store at least data indicative of the shape of the item;
an object arrangement database configured to store data indicative of an arrangement pattern of the item;
a sensor data integrating section configured to output integrated data indicative of the outline of the item by converting the measured data with the sensor while the moving mechanism is moving the sensor into three-dimensional coordinates represented in a single three-dimensional space; and
an object comparison calculator configured to create an object model based on the data indicative of the shape of the item and stored in the object information database, reference the data indicative of the arrangement pattern of the item and stored in the object arrangement database, compare the created object model with the integrated data, and output actual object arrangement data indicative of an actual arrangement of the measured item.

11. The inventory system according to claim 10, wherein
the computer further includes an object position calculator configured to generate global actual object arrangement data indicative of the actual position of the object in a three-dimensional global space based on the sensor position data and the actual object arrangement data.

12. The inventory system according to claim 11, wherein
the object position calculator is configured to output the global actual object arrangement data including the number of objects.

13. The inventory system according to claim 12, wherein
the computer further includes a range data integrating section, a sensor position direction estimating section and a movement controller, the range data integrating section configured to create an environment map of inside the warehouse based on the sensor data generated by the sensor, the sensor position direction estimating section configured to estimate the position of the sensor on the environment map based on the sensor data and the environment map, the movement controller configured to control the moving mechanism based on the estimated position of the sensor and move the moving mechanism along a predetermined movement path.

14. The inventory system according to claim 11, wherein
the object comparison calculator is configured to count the number of the objects.

15. The inventory system according to claim 14, wherein
the object comparison calculator is configured to reference the arrangement pattern and move the created object model, and when the density of point cloud represented by the integrated data and placed in a check region of the moved object model is higher than a threshold, the object comparison calculator is configured to determine that the object is placed at the position of the object model.

16. The inventory system according to claim 14, wherein
the object comparison calculator is configured to temporarily place the created object model in accordance with the arrangement pattern of the object, and when the density of point cloud represented by the integrated data and placed in a check region of the created object model is higher than a threshold, the object comparison calculator is configured to determine that the object is placed at the position of the temporarily placed object model.

17. The inventory system according to claim 11, further comprising another sensor configured to identify the position of the sensor that is moved by the moving mechanism.

18. The inventory system according to claim 10,
wherein the sensor is configured to obtain range data, as point cloud, indicative of a distance between the sensor and the item and an angle formed between the measurement direction and a direction to which the item is placed, and wherein the sensor data integrating section is configured to:
convert each point of the range data indicative of the distance and the angle into three-dimensional coordinates based on the position of the sensor when the sensor measures the item and the direction of the sensor, and
output all points of the range data as the three-dimensional coordinates represented in the single three-dimensional space.

* * * * *